(12) United States Patent
Viger et al.

(10) Patent No.: US 11,032,852 B2
(45) Date of Patent: Jun. 8, 2021

(54) QOS MANAGEMENT FOR MULTI-USER EDCA TRANSMISSION MODE IN 802.11AX NETWORKS

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/343,735

(22) PCT Filed: Oct. 27, 2017

(86) PCT No.: PCT/EP2017/077611
§ 371 (c)(1),
(2) Date: Apr. 19, 2019

(87) PCT Pub. No.: WO2018/078101
PCT Pub. Date: May 3, 2018

(65) Prior Publication Data
US 2019/0274171 A1 Sep. 5, 2019

(30) Foreign Application Priority Data
Oct. 28, 2016 (GB) ..................... 1618262

(51) Int. Cl.
*H04W 74/08* (2009.01)
*H04W 28/02* (2009.01)
(Continued)

(52) U.S. Cl.
CPC ... *H04W 74/0833* (2013.01); *H04W 28/0268* (2013.01); *H04W 72/1242* (2013.01);
(Continued)

(58) Field of Classification Search
CPC ......... H04W 74/0833; H04W 28/0268; H04W 72/1242; H04W 74/02; H04W 84/18
See application file for complete search history.

(56) References Cited

U.S. PATENT DOCUMENTS

2006/0062189 A1 3/2006 Takeuchi
2013/0176902 A1 7/2013 Wentink et al.
(Continued)

FOREIGN PATENT DOCUMENTS

EP 3533279 A1 9/2019
GB 2555142 A 4/2018
(Continued)

OTHER PUBLICATIONS

Laurent Cariou, et al., 2 sets of EDCA parameters, IEEE 802.11-16/099. Sep. 2016, 32 pages.
(Continued)

*Primary Examiner* — Ronald B Abelson
(74) *Attorney, Agent, or Firm* — Canon U.S.A., Inc. IP Division

(57) ABSTRACT

The invention relates to wireless network comprising an access point and non-AP stations. The station has traffic queues and associated a backoff counters which are decremented over time upon continuously sensing the medium as free during more than respective AIFS durations. To compensate additional opportunities provided by OFDMA RUs, a queue switches to an MU mode upon transmitting its data in an RU provided by the AP. To restore dynamicity of the backoff counters, frozen in the MU mode in the known techniques, embodiments provide the following at each expiry of one of the queue backoff counters: the current mode of the expiring traffic queue is determined; in case of legacy mode, the station accesses the channel to transmit data from the queue; whereas in case of MU mode, a new
(Continued)

backoff value is drawn to reset the expiring backoff counter, without having data from the queue being transmitted.

11 Claims, 14 Drawing Sheets

(51) Int. Cl.
*H04W 72/12* (2009.01)
*H04W 74/02* (2009.01)
*H04W 84/18* (2009.01)
*H04L 5/00* (2006.01)
*H04W 84/12* (2009.01)

(52) U.S. Cl.
CPC ........... *H04W 74/02* (2013.01); *H04W 84/18* (2013.01); *H04L 5/0007* (2013.01); *H04W 28/0284* (2013.01); *H04W 84/12* (2013.01)

(56) References Cited

U.S. PATENT DOCUMENTS

| | | |
|---|---|---|
| 2013/0279427 A1 | 10/2013 | Wentink et al. |
| 2015/0281980 A1 | 10/2015 | Zhou et al. |
| 2016/0198500 A1 | 7/2016 | Merlin et al. |
| 2016/0262173 A1 | 9/2016 | Josiam et al. |
| 2018/0310338 A1* | 10/2018 | Li .......................... H04W 74/08 |

FOREIGN PATENT DOCUMENTS

| | | |
|---|---|---|
| GB | 2555455 A | 5/2018 |
| GB | 2575555 A | 1/2020 |
| KR | 10-0560461 B1 | 3/2006 |
| KR | 10-2015-0011355 A | 1/2015 |
| KR | 10-2015-0029516 A | 3/2015 |
| RU | 2509433 C2 | 3/2014 |
| RU | 2551366 C1 | 5/2015 |
| RU | 2569569 C2 | 11/2015 |
| WO | 2016-089537 A1 | 6/2016 |

OTHER PUBLICATIONS 802.11—2012—IEEE Standard for Information technology—Telecommunications and information exchange between systems Local and metropolitan area networks—Specific requirements Part 11: Wireless LAN Medium Access Control (MAC) and Physical Layer (PHY) Specifications, IEEE, Mar. 2012, 10 pages.

Evgeny Khorov (IITP RAS), Channel Access Efficiency, IEEE 802.11-16/0, 684r2, IEEE, Sep. 2016, 15 pages.

Laurent Cariou, et al., Proposed Spec Text for MU_EDCA Parameters, IEEE P802.11 Wireless LANs, Resolution for CID 9058 and 9075, Sep. 1, 2016, 8 pages.

* cited by examiner

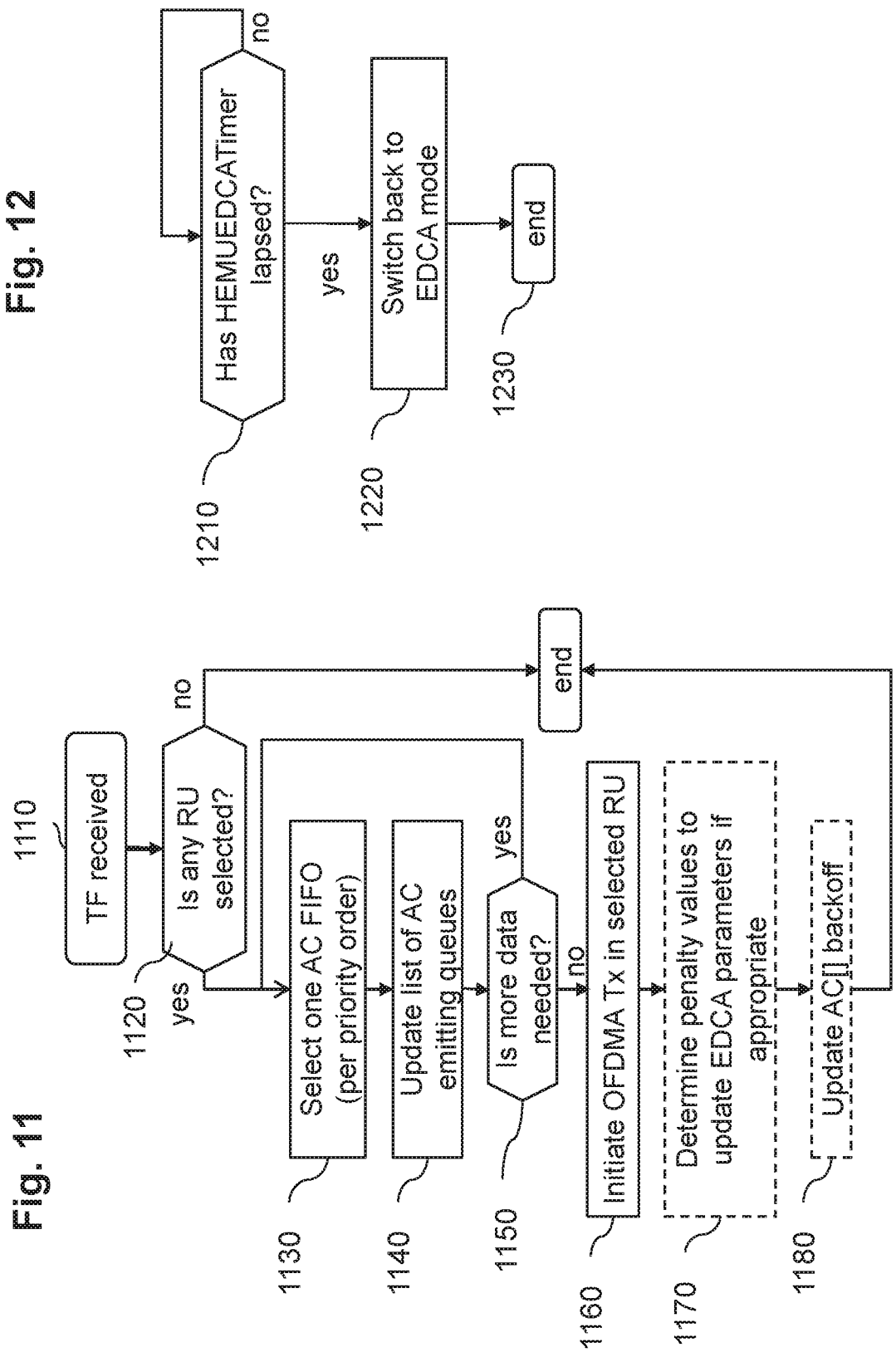

QOS MANAGEMENT FOR MULTI-USER EDCA TRANSMISSION MODE IN 802.11AX NETWORKS

This application is the National Phase application of PCT Application No. PCT/EP2017/077611, filed on Oct. 27, 2017 and titled "QoS Management For Multi-User EDCA Transmission Mode In 802.11ax Networks." This application claims the benefit under 35 U.S.C. § 119(a)-(d) of United Kingdom Patent Application No. GB 1618262.8, filed on Oct. 28, 2016. The above cited patent applications are incorporated herein by reference in their entirety.

FIELD OF THE INVENTION

The present invention relates generally to communication networks and more specifically to wireless communication methods in a wireless network comprising an access point (AP) and a plurality of non-AP stations, and corresponding devices. It is directed to communication networks offering channel accesses to the non-AP stations through contention, such as EDCA, and providing secondary accesses to the non-AP stations to sub-channels (or Resource Units) splitting a transmission opportunity TXOP granted to the access point, in order to transmit data.

The invention finds application in wireless communication networks, in particular in 802.11ax networks offering, to the stations, an access to an 802.11ax composite channel and/or to OFDMA Resource Units forming for instance an 802.11ax composite channel granted to the access point and allowing Uplink communication to be performed.

BACKGROUND OF THE INVENTION

The IEEE 802.11 MAC family of standards (a/b/g/n/ac/ etc.) define a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The original access DCF method has been improved into the well-known Enhanced Distributed Channel Access (EDCA) method, to take into account prioritized data traffics when accessing communication channels of the network.

EDCA defines traffic categories and four corresponding access categories that make it possible to handle differently high-priority traffic compared to low-priority traffic.

Implementation of EDCA in the stations can be made using a plurality of traffic queues (known as "Access Categories") for serving data traffic at different priorities, each traffic queue being associated with a respective queue backoff counter. The queue backoff counter is initialized with a backoff value randomly drawn from respective queue contention parameters, e.g. EDCA parameters, and is used to contend for access to a communication channel in order to transmit data stored in the traffic queue.

Legacy EDCA parameters include $CW_{min}$, $CW_{max}$ and AIFSN for each traffic queue, wherein $CW_{min}$ and $CW_{max}$ are the lower and higher boundaries of a selection range from which an EDCA contention window CW is selected for a given traffic queue. AIFSN stands for Arbitration Inter-Frame Space Number, and defines the number of time slots (usually 9 µs), additional to a DIFS interval (the total defining the AIFS period), the station must sense the medium as idle before decrementing the queue backoff value associated with the traffic queue considered. It means, through EDCA, the station decrements the queue backoff counters over time as long as the communication channel is continuously sensed as idle during more than respective arbitration inter frame space durations.

The legacy EDCA parameters may be defined in a beacon frame sent by the AP in the network to broadcast network information.

The contention windows CW and the queue backoff values are EDCA variables.

Conventional EDCA backoff procedure consists for the station to randomly select a backoff value for a traffic queue backoff counter from the respective contention window CW, and then to decrement it upon sensing the medium as idle after the AIFS period. Once the backoff value reaches zero, the station is allowed to access the medium.

The EDCA queue backoff counters thus play two roles for the station. First, they drive the stations in efficiently accessing the medium, by reducing risks of collisions; second, they offer management of quality of service, QoS, by mirroring the aging of the data contained in the traffic queues (the more aged the data, the lower the backoff value) and thus providing different priorities to the traffic queues through different values of the EDCA parameters (especially the AIFSN parameter that delays the start of the decrementing of the EDCA queue backoff counters).

The station use the EDCA backoff procedure to access the communication network through backoff-based contention.

Recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In particular, recent developments in the 802.11ax standard sought to optimize usage of the communication channel by multiple stations in a wireless network having an access point (AP). Indeed, typical contents have important amount of data, for instance related to high-definition audio-visual real-time and interactive content; and they should be transmitted with required quality of service, QoS.

Furthermore, it is well-known that the performance of the CSMA/CA protocol used in the IEEE 802.11 standard deteriorates rapidly as the number of stations and the amount of traffic increase, i.e. in dense WLAN scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations to simultaneously transmit.

To actually perform such multi-user transmission, it has been proposed to split a granted communication channel into sub-channels, also referred to as resource units (RUs), that are shared in the frequency domain by multiple users (non-AP stations), based for instance on Orthogonal Frequency Division Multiple Access (OFDMA) technique. Each RU may be defined by a number of tones, the 80 MHz channel containing up to 996 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different stations in order to increase concurrency. Adjacent sub-carriers often experience similar channel conditions and are thus grouped to sub-channels: an OFDMA sub-channel or RU is thus a set of sub-carriers.

The multi-user feature of OFDMA allows the AP to assign different RUs to different non-AP stations in order to increase competition. This may help to reduce contention and collisions inside 802.11 networks.

In OFDMA, different subsets of sub-carriers in the channel bandwidth can be used by different frame transmissions at the same time. In the downlink direction, the AP is allowed to emit parallel transmissions to different receiving non-AP stations. These transmissions are called Multi-User Downlink transmissions (MU DL). In addition, the AP can provide uplink transmission schedules to the non-AP stations; this kind of transmission scheme is called Multi-User Uplink (MU UL).

To support multi-user uplink, i.e. uplink transmission to the 802.11ax access point (AP) during the granted TXOP, the 802.11ax AP has to provide signalling information for the legacy stations (non-802.11ax stations) to set their NAV and for the 802.11ax client stations to determine the allocation of the resource units RUs provided by the AP.

The 802.11ax standard defines a new control frame, namely a trigger frame (TF), that is sent by the AP to the stations to trigger Multi-User uplink communications.

The document IEEE 802.11-15/0365 proposes that a "Trigger Frame" (TF) is sent by the AP to solicit the transmission of Multi-User uplink (MU UL) OFDMA PPDU from multiple stations. The TF defines the resource units as provided by the AP to the non-AP stations. In response, the stations transmit MU UL (OFDMA) PPDUs as immediate responses to the Trigger frame. All transmitters can send data at the same time, but using disjoint sets of RUs (i.e. of frequencies in the OFDMA scheme), resulting in transmissions with less interference.

A resource unit RU can be reserved by the AP for a specific station, in which case the AP indicates, in the TF, the station to which the RU is reserved. Such RU is called Scheduled RU. The indicated station does not need to perform contention to access it.

On the other hand, one or more resource units may be proposed by the AP to the 802.11ax stations through contention-based access. These RUs are called Random RUs, and contribute to improve efficiency of the network with regards to un-managed traffic to the AP.

When several communication channels (usually of 20 MHz width) are pre-empted by the AP, all control frames, including the Trigger Frames, are duplicated on each of the pre-empted channels. This is for the legacy stations operating on any of these channels to be able to set their NAV.

The 802.11ax standard considers several types of Trigger Frame, to trigger various items of information to the stations. For example, a trigger frame may be used to retrieve uplink data traffic stored in station's traffic queues. In another example, a Trigger Frame may be used to request Buffer Status Reports (BSRs) from stations to determine which 802.11ax stations hold uplink packets waiting for transmission and their related size (amount of data in stations traffic queues).

As readily apparent from the above, the Multi User Uplink medium access scheme (or OFDMA or RU access scheme) allows the number of collisions generated by simultaneous medium access attempts to be reduced, while also reducing the overhead due to the medium access since the medium access cost is shared between several stations. The OFDMA or RU access scheme thus appears to be quite more efficient (with regards of the medium usage) than the conventional EDCA contention-based medium access scheme (in the context of a high density 802.11 cell).

Although the OFDMA or RU access scheme seems more efficient, the EDCA access scheme must also survive and thus coexist with the OFDMA or RU access scheme.

This is mainly due to the existence of legacy 802.11 stations which must still have the opportunity to access the medium, whereas they are not aware of the OFDMA or RU access scheme. Also, overall fairness in access to the medium must be ensured.

This is also all the more necessary that the 802.11ax stations should also have the opportunity to gain access to the medium through conventional EDCA contention-based medium access, for instance to directly send data to another station (i.e. peer-to-peer [P2P] traffic different from uplink traffic to the AP).

So the two medium access schemes, EDCA and OFDMA/RU access schemes, have to coexist.

This coexistence has downsides.

For instance, 802.11ax stations and legacy stations have the same medium access probability using the EDCA access scheme. However, the 802.11ax stations have additional medium access opportunities using the MU Uplink or OFDMA or RU access scheme.

It results that access to the medium is not fully fair between the 802.11ax stations and the legacy stations.

To restore some fairness between the stations, solutions have been proposed to modify, upon successfully transmitting data over an accessed resource unit (i.e. through MU UL OFDMA transmission), a current value of at least one EDCA parameter into a penalized or degraded value, to reduce a probability for the station to access again the communication channel through EDCA contention. For instance, the penalized or degraded value to be used for the EDCA parameter is more restrictive than the original (or legacy) value.

For instance, it has been proposed that upon successfully (MU UL OFDMA) transmitting data in a resource unit, RU, reserved by the AP to it, an 802.11ax station switches into an MU EDCA mode for a predetermined duration counted down by a timer (noted HEMUEDCATimer below, standing for High Efficiency Multi-User EDCA Timer). In the MU EDCA mode, the set of EDCA parameters of the station has been modified (concretely penalized) to reduce the probability for the station to access again the communication channel through EDCA access scheme.

The penalized or degraded values for the set of MU EDCA parameters are provided by the AP in a dedicated information element (typically in beacon or association frames).

The approach disclosed in this document suggests increasing only the value of AIFSN for each traffic queue transmitting in the accessed RU, while keeping $CW_{min}$, and $CW_{max}$ unchanged. As the corresponding AIFS period increases, the traffic queue in the MU EDCA mode is substantially delayed from having its queue backoff counter been decremented upon sensing the medium as being free. This is particularly significant in high density environment in which the medium does not remain free for a long time.

Upon switching into the MU EDCA mode, the station starts its HEMUEDCATimer countdown. The HEMUEDCATimer is reinitialized each time the station successfully (MU UL OFDMA) transmits data in a new reserved RU, regardless of the traffic queue from which the transmitted data come. The initializing value of HEMUEDCATimer is suggested to be high (e.g. tens of milliseconds) in order to encompass several new opportunities for MU UL transmissions.

The HEMUEDCATimer mechanism means the station remains in the MU EDCA state as long as the AP provides reserved RUs to the station.

When the HEMUEDCATimer lapses, the traffic queues in MU EDCA mode are switched back to the legacy EDCA mode with legacy EDCA parameters, thereby exiting the queues from the MU EDCA mode.

Thus, this mechanism of double operating modes, legacy EDCA mode and MU EDCA mode, promotes the usage of the MU UL mechanism by reducing the probability of a station in the MU EDCA mode to gain access to the medium using the legacy EDCA mechanism.

In addition, the document proposed to give a specific value to the AIFSN parameter in the set of degraded/penalized parameters provided by the AP. This specific value indicates to the stations that it shall use a very high value for the AIFSN of the concerned traffic queue or queues.

As described in the document, the very high value for AIFSN is proposed to be equal to the HEMUEDCATimer value also provided by the AP. Typically, the HEMUEDCATimer timer value is about tens of milliseconds, to be compared to less than 0.1 millisecond for the worst AIFS[i] in the legacy EDCA mode.

'0' is proposed to be used for the specific value of the AIFSN parameter. As this value is usually not allowed for an AIFSN (because AIFS must be at least equal to a DIFS), it is directly detected by the stations as being a code to use the HEMUEDCATimer to set AIFSN.

A consequence of this scheme is that traffic queues in the MU EDCA mode are less frequently granted a transmission opportunity through EDCA contention. It thus seems clear that the usage of the code value ('0' until now) aims at making an EDCA access for these traffic queues less frequent. On the other hand, it simplifies the process at the AP, which no longer has to compute a relevant penalized AIFSN value.

However, by preventing the backoff counters to evolve when the station uses the penalized MU EDCA parameters, this mechanism makes the queue backoff counters no longer mirror which traffic queue should have the highest priority of transmission in the meaning of conventional EDCA (e.g. with oldest data stored in it). For instance, when the station receives a trigger frame with a scheduled RU dedicated to it, the station, having its backoff counters frozen, cannot anymore use them to handle its QoS and send the data with the highest priority (not only regarding its Access Category, but also regarding the respective ages of the data in the AC[ ] queues).

The QoS in the network is thus severely deteriorated, and a need is felt to re-introduce proper QoS operations for traffic prioritization, which would be adapted to the medium access penalty scheme envisaged in the 802.11ax standard.

SUMMARY OF INVENTION

The present invention seeks to overcome the foregoing concerns. In particular, it seeks to overcome the loss of QoS handling resulting from the introduction of the MU UL OFDMA transmissions.

From 802.11e introduction, the priority of the data is handled via the EDCA backoff mechanism, together with the four Access Categories traffic queues. The introduction of the MU UL OFDMA communication has broken the ability of the EDCA backoff counters to mirror the relative priorities of the four AC traffic queues, due to the non-evolution of the EDCA backoff counters upon transmission of data over MU UL OFDMA resource units.

The invention thus intends to restore some EDCA-like behaviour to the queue backoff counters, with the view of restoring a relevant mirroring of the relative priorities of the AC queues.

In this context, the present invention proposes a communication apparatus comprising:

receiving means for receiving a signal transmitted from a base station constructing a wireless network conforming to IEEE802.11 series of standards, the signal including information on an AIFSN value, and control means for performing control so that, in a case where the AIFSN value included in the signal received by the receiving means is zero, data of an access category for which Enhanced Distributed Channel Access (EDCA)-access to the wireless network is gained are not transmitted over the wireless network.

Conversely, a communication method is also proposed where a station:

receives a signal transmitted from a base station constructing a wireless network conforming to IEEE802.11 series of standards, the signal including information on an AIFSN value, and performs control so that, in a case where the AIFSN value included in the signal received by the receiving means is zero, data of an access category for which Enhanced Distributed Channel Access (EDCA)-access to the wireless network is gained are not transmitted over the wireless network.

Other embodiments of the invention provide a communication method in a communication network comprising a plurality of stations, at least one station comprising a plurality of traffic queues for serving data traffic at different priorities, each traffic queue being associated with a respective queue backoff counter to contend for access to a communication channel in order to transmit data stored in the traffic queue;

the method comprising, at the station:

decrementing the queue backoff counters over time as long as the communication channel is (usually continuously) sensed as idle (or free or available) during more than respective arbitration interframe space, AIFS, durations. It means each traffic queue detects the medium as idle during its respective AIFS, before decrementing its backoff counter at each new consecutive time slot during which the network is still sensed as idle;

switching any traffic queue from a legacy contention mode to an MU contention mode upon (preferably successfully) transmitting data stored in the traffic queue, in an accessed resource unit provided by an access point within a transmission opportunity granted to the access point on the communication channel; and upon one of the queue backoff counters expiring (i.e. lapsing, for instance when reaching zero), determining, based on the current (i.e. upon expiry) mode of the associated traffic queue, whether to access the communication channel to transmit data stored in the associated traffic queue, or to draw a new backoff value to reset the expiring queue backoff counter without having data from the associated traffic queue being transmitted in the communication channel.

These embodiments can reinstate the decrementing of the backoff counters while still keeping the penalty scheme envisioned in the 802.11ax standard. The aging of the data in the traffic queue can thus be restored, and so the QoS.

This is achieved by the proposed control of the medium access once a backoff counter expires. Contrary to prior art preventive measures avoiding the backoff counter to expire, the proposed scheme is a reactive counter-measure to such a backoff counter reaching zero. Dynamic behavior of the backoff counters is thus possible again.

Consequences of these embodiments include the fact the backoff counters can mirror again the aging of the data in ACs, but also include the fact restrictive AIFSN values are no longer required.

Correspondingly, these embodiments also provide a communication station in a communication network comprising a plurality of stations, the communication station comprising:

a plurality of traffic queues for serving data traffic at different priorities, each traffic queue being associated with a respective queue backoff counter to contend for access to a communication channel in order to transmit data stored in the traffic queue; and at least one microprocessor configured for carrying out the following steps:

decrementing the queue backoff counters over time as long as the communication channel is sensed as idle during more than respective arbitration interframe space durations;

switching any traffic queue from a legacy contention mode to an MU contention mode upon transmitting data stored in the traffic queue, in an accessed resource unit provided by an access point within a transmission opportunity granted to the access point on the communication channel; and upon one of the queue backoff counters expiring, determining, based on the current mode of the associated traffic queue, whether to access the communication channel to transmit data stored in the associated traffic queue, or to draw a new backoff value to reset the expiring queue backoff counter without having data from the associated traffic queue being transmitted in the communication channel.

The station has the same advantages as the method defined above.

Optional features of the invention are defined in the appended claims. Some of these features are explained here below with reference to a method, while they can be transposed into system features dedicated to any communication station according to the invention.

In embodiments, if the current mode is the legacy contention mode, the station accesses the communication channel to transmit data stored in the associated traffic queue, whereas if the current mode is the MU contention mode, the new backoff value is drawn to reset the expiring queue backoff counter, without having data from the associated traffic queue being transmitted in the communication channel.

This ensures the penalty scheme envisioned in the 802.11ax standard to be kept: EDCA scheme still operates, while no medium access is allowed to a traffic queue in MU EDCA mode, even if its associated backoff counter, with restored dynamicity, expires. This is the control offered by the present invention.

In some embodiments, determining whether to access the communication channel or to draw a new backoff value is further based on the data currently stored in the associated traffic queue. This approach makes it possible to adjust the penalty scheme to some types of data, in particular with a view of keeping QoS fairness for data not concerned with the MU UL transmission.

According to specific features, if the current mode is the legacy contention mode or if data stored in the associated traffic queue include data to be addressed to another station different from the access point (i.e. it is P2P data), the station accesses the communication channel to transmit data stored in the associated traffic queue, whereas if the current mode is the MU contention mode and data stored in the associated traffic queue does not include data to be addressed to another station different from the access point, the new backoff value is drawn to reset the expiring queue backoff counter, without having data from the associated traffic queue being transmitted in the communication channel.

In this configuration, QoS fairness is kept for P2P traffic, as it is not concerned with the MU UL transmissions to the AP. In other words, the present invention allows EDCA access to the medium for P2P data, even if the station is in the MU EDCA mode for the same AC.

In this context, it may be provided that, in case of access to the communication channel, only data stored in the associated traffic queue in the MU contention mode and to be addressed to another station different from the access point are transmitted in the accessed communication channel. It means only P2P data are allowed in conventional EDCA accesses, while the station (or corresponding AC) is in the MU EDCA mode.

In some embodiments, the MU contention mode uses the same arbitration interframe space durations as the legacy contention mode. Due to the reactive approach of the invention, control to medium access in the penalty scheme is no longer dependent on the contention parameters, but mainly on the additional test of the current mode upon expiry of any backoff counter. As a result, AIFSN no longer need to be modified, and thus modified values for the AIFSN no longer need to be transmitted by the AP. Consequently, processing at the stations and the AP is reduced, while use of bandwidth to transmit the penalized EDCA parameters is also reduced.

In specific embodiments, each queue backoff counter is reset with an associated backoff value drawn from a respective contention window, and the MU contention mode uses the same lower boundary $CW_{min}$ and/or same higher boundary $CW_{max}$, both defining a selection range from which a size of the contention window is selected, as the legacy contention mode.

This configuration simplifies the entering into and the exiting from the MU contention mode (e.g. MU EDCA mode) since the contention window can be kept unchanged. However, variants may contemplate having different boundaries between the legacy and MU contention modes.

In some embodiments, the method further comprises, at the station, switching back a traffic queue to the legacy contention mode upon expiry of an MU mode timer (referred to as HEMUEDCATimer in the standard) initialized when the traffic queue switched to the MU contention mode. According to a specific feature, the MU mode timer is shared by all the traffic queues and is reinitialized to a predetermined duration each time data from any traffic queue is transmitted in an accessed resource unit provided by the access point within any subsequent transmission opportunity granted to the access point on the communication channel. It means all the traffic queues in the MU contention mode exit the MU contention mode upon the predetermined duration lapsing without any data from the station being transmitted in any RU provided by the AP within subsequent transmission opportunities.

In some embodiments, data transmitted in a resource unit provided by the access point within a transmission opportunity granted to the access point are retrieved from at least one traffic queue selected based on a current (i.e. upon accessing the medium) backoff value of its associated queue backoff counter.

A fair management of QoS is thus maintained when implementing the present invention.

According to a specific feature, the traffic queue selection selects the traffic queue or queues having the lowest current backoff value. EDCA-like behaviour of the AC queues is thus kept.

In alternate embodiments, data transmitted in a resource unit provided by the access point within a transmission opportunity granted to the access point are retrieved from a preferred traffic queue indicated by the access point.

According to a specific feature, the preferred traffic queue indication is included in a trigger frame received from the access point, the trigger frame reserving the transmission opportunity granted to the access point on the communication channel and defining resource units, RUs, forming the communication channel including the accessed resource unit.

This approach makes it possible for the AP to drive the QoS management.

In other embodiments, a reset flag is associated with each traffic queue, which is enabled each time a new backoff value is drawn to reset the associated queue backoff counter without having data from the traffic queue being transmitted, and is disabled each time data from the traffic queue are transmitted, and data transmitted in a resource unit provided by the access point within a transmission opportunity granted to the access point are retrieved from at least one traffic queue selected based on the enabled or disabled status of the reset flags associated with the traffic queues.

Preferably, data transmitted in a resource unit provided by the access point within a transmission opportunity granted to the access point are retrieved from a traffic queue having an enabled reset flag.

The reset flags of these configurations save QoS information regarding the traffic queues. Indeed, due to the drawing of a new backoff value, the priority of a traffic queue may be lost compared to the other traffic queues (because no data is transmitted in the MU EDCA mode at the redrawn timing of the new backoff value for this case). The reset flag is thus used to indicate which traffic queues had priority data that should be transmitted urgently when accessing an RU.

In some embodiments, the method further comprises, at the station, computing, for at least one traffic queue transmitting in the accessed resource unit, a new backoff value to reset the associated queue backoff counter.

This approach restores a fairer QoS management because the same behavior as conventional EDCA is applied here (new backoff value for a traffic queue each time it transmits).

In specific embodiments, a new backoff value is computed only for the transmitting traffic queue from which data are transmitted at the beginning of the accessed resource unit. Usually, the first transmitting queue is supposed to transmit the majority of the data in the accessed resource unit. The other transmitting queue or queues only send few data to fill the bandwidth available in the accessed resource unit (given the TXOP). In this respect, drawing a new backoff value for these "secondary" queues would be very damageable for their remaining data, which thus would have to wait for a longer time than with a direct OFDMA access. Consequently, the proposed implementation keeps fairness with regards to these secondary queues, by keeping their same future probability of transmission.

In variants, a new queue backoff value is computed for each transmitting traffic queue. A fair QoS management is thus achieved since exactly the same behavior as conventional EDCA is applied.

In some embodiments, the backoff values used to reset the queue backoff counters are computed based on contention parameter sets, each associated with a respective traffic queue, and the method further comprises, at the station, resetting the contention parameter set associated with a (preferably each) traffic queue remained in the MU contention mode during at least a parameter lifespan duration to a by-default parameter set. For instance, the parameter lifespan duration may correspond to at least two times the predetermined duration used to initialize the MU mode timer (HEMUEDCATimer).

This contributes to increase network efficiency. Indeed, as the concerned traffic queue has remained in the MU contention mode for a long time, its contention parameters, usually EDCA parameters, no longer mirror the actual network conditions. Therefore, resetting them erases any old network constraint that they could embed. It is as if the traffic queue was a new one in the network, without having any knowledge on the network conditions.

In other embodiments, the method further comprises, at the station, drawing a new backoff value to reset the expiring queue backoff counter, after data stored in the associated traffic queue have been transmitted in the accessed communication channel. Conventional EDCA scheme is thus kept when the station or traffic queue is in the legacy EDCA contention mode.

In yet other embodiments, the method further comprises, at the station, receiving, from the access point, a trigger frame reserving the transmission opportunity granted to the access point on the communication channel and defining at least one resource unit, RU, (preferably a plurality thereof) forming the communication channel including the accessed resource unit. This follows the standard requirements to declare the RUs.

In yet other embodiments, the transmitting traffic queue or queues are switched to the MU contention mode only upon successfully transmitting the data in the accessed resource unit. This configuration guarantees fairness. Indeed, in the philosophy of contention mode switching, the penalizing MU contention mode should only be implemented to compensate the existence of other transmission opportunities (here through RUs), meaning data are successfully transmitted.

In yet other embodiments, the accessed resource unit over which the data are transmitted is a random resource unit, the access of which being made through contention using a RU contention parameter set separate from a contention parameter set used to draw the backoff values to reset the queue backoff counters.

In yet other embodiments, the accessed resource unit over which the data are transmitted is a scheduled resource unit, the scheduled resource being assigned by the access point to the station.

Of course, some stations may access scheduled RUs while other stations may simultaneously access random RUs, resulting in having simultaneously various stations in the MU contention mode (for one or more AC queues).

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 11 illustrates, using a flowchart, steps of accessing resource units based on an RU or OFDMA access scheme upon receiving a trigger frame defining RUs according to embodiments of the invention;

FIG. 12 illustrates, using a flowchart, the station management to switch back (or fallback) from the MU contention mode to the legacy contention mode, according to embodiments of the invention;

DETAILED DESCRIPTION

The invention will now be described by means of specific non-limiting exemplary embodiments and by reference to the figures.

Figure 1:
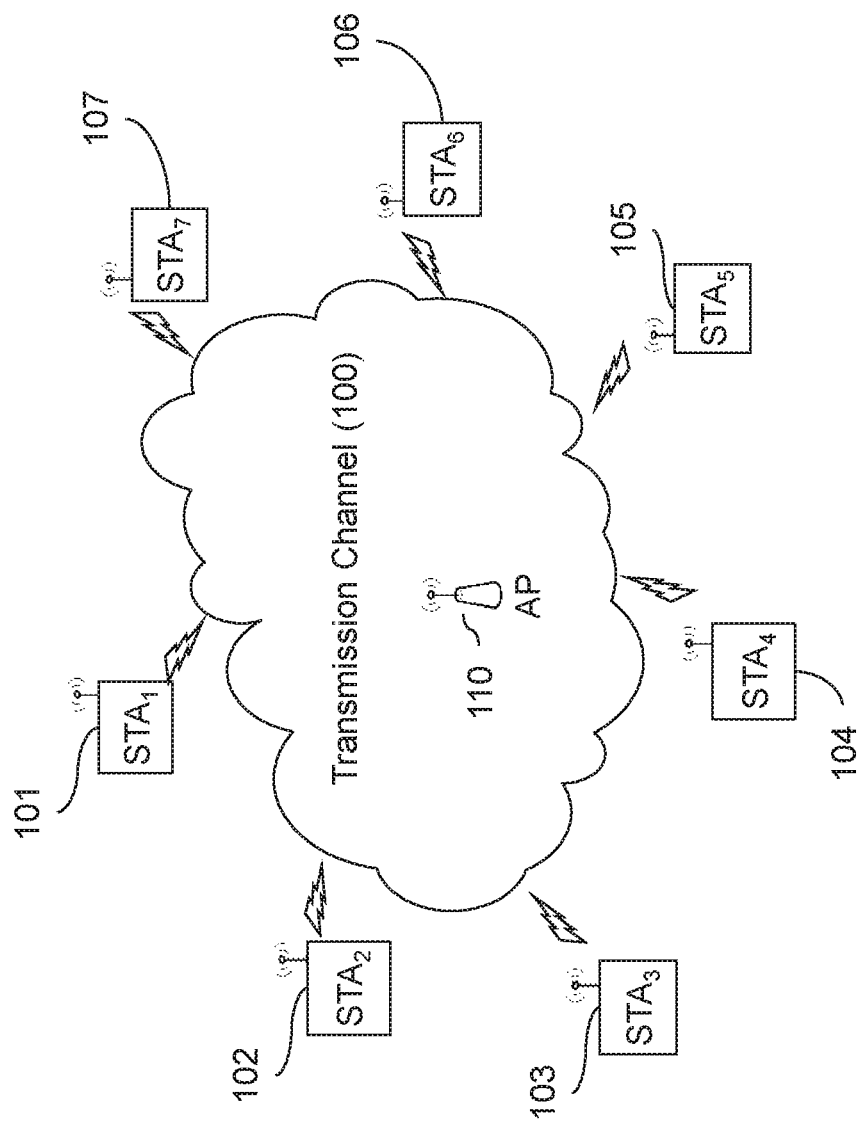
FIG. 1 illustrates a typical wireless communication system in which embodiments of the invention may be implemented.

FIG. 1 illustrates a communication system in which several communication stations (or "nodes") 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel.

In the following, the word "station" refers to any kind of station. The wording "access point station", or in short "access point" (AP), refers to the station playing the role of access point 110. The wording "non access point station", or in short "non-AP station", or client station (STA) refers to the other stations 101-107.

Access to the shared radio medium to send data frames is primarily based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

The wireless communication system of FIG. 1 comprises physical access point 110 configured to manage the WLAN BSS (Basic Service Set), i.e. a group of non-AP stations which have previously registered to the AP. Such BSS managed by the AP is called an infrastructure BSS. In the following, the term BSS will be used as an equivalent of infrastructure BSS.

Once the BSS is established, the Access Point can bridge traffic inside the BSS or from other networks (e.g. wired networks) into the BSS (or vice and versa). Thus, the stations of the BSS should talk to the AP only, which is in charge of relaying data frames if the data frames are targeted to another station of the BSS.

To access the medium, any station, including the AP, starts counting down a backoff counter designed to expire after a number of timeslots, chosen randomly in a so-called contention window [0, CW], CW (integer). This backoff mechanism or procedure, also referred to as channel access scheme, is the basis of the collision avoidance mechanism that defers the transmission time for a random interval, thus reducing the probability of collisions on the shared channel. After the backoff time expires (i.e. the backoff counter reaches zero), the source station may send data or control frames if the medium is idle.

Management of quality of service (QoS) has been introduced at station level in the wireless networks, through well-known EDCA mechanism defined in the IEEE 802.11e standard.

Indeed, in the original DCF standard, a communication station includes only one transmission queue/buffer. However, since a subsequent data frame cannot be transmitted until the transmission/retransmission of a preceding frame ends, the delay in transmitting or retransmitting the preceding frame prevented the communication from having QoS.

Figures 2A, 2B:
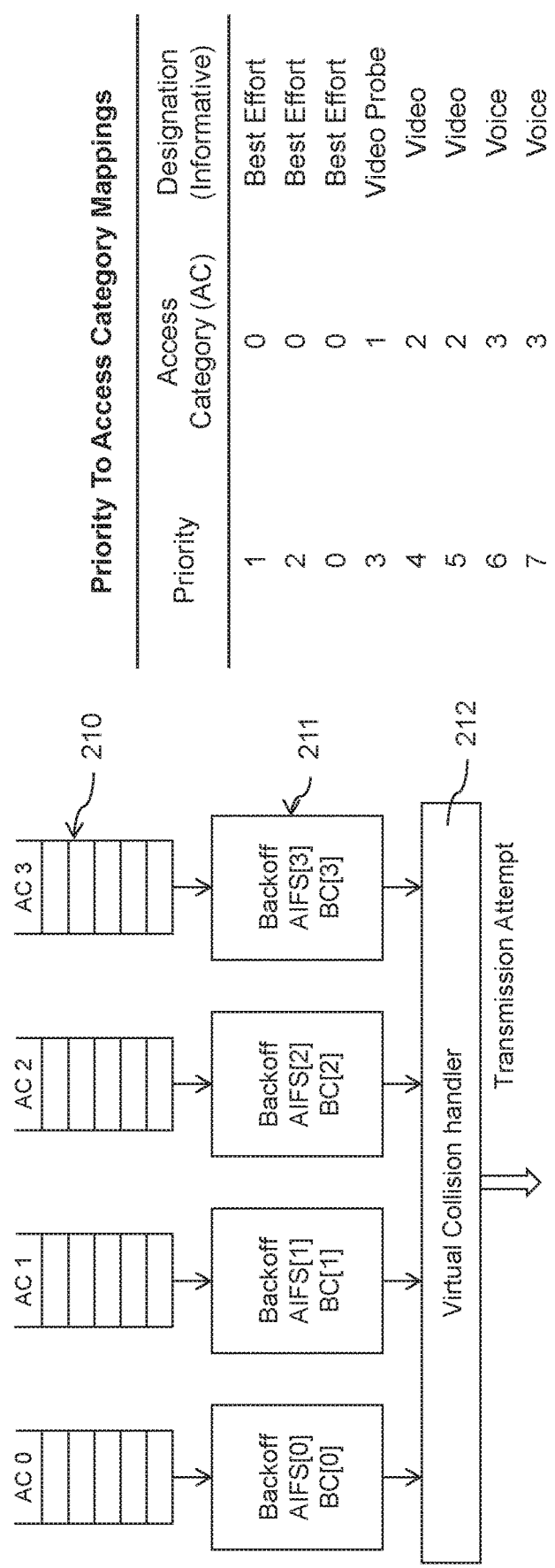
FIG. 2a illustrates the IEEE 802.11e EDCA involving access categories.
FIG. 2b illustrates an example of mapping between eight priorities of traffic class and the four EDCA ACs.

FIG. 2a illustrates the IEEE 802.11e EDCA mechanism involving access categories, in order to improve quality of service (QoS), to make more efficient use of the wireless medium.

The 802.11e standard relies on a coordination function, called hybrid coordination function (HCF), which has two modes of operation: enhanced distributed channel access (EDCA) and HCF controlled channel access (HOCA).

EDCA enhances or extends functionality of the original access DCF method: EDCA has been designed to support prioritized traffics similar to DiffSery (Differentiated Services), which is a protocol for specifying and controlling network traffic by class so that certain types of traffic get precedence.

EDCA is the dominant channel access scheme or mechanism in WLANs because it features a distributed and easily deployed mechanism. The scheme contends for access to at least one communication channel of the communication network using EDCA contention parameters, in order for the station to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Usually, the four ACs are the following in decreasing priority order: voice (or "AC_VO"), video (or "AC_VI"), best effort (or "AC_BE") and background (or "AC_BG").

Of course, another number of traffic queues may be contemplated.

Each AC has its own traffic queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of queue contention parameters, and is associated with a priority value, thus defining traffics of higher or lower priority of MSDUs. Thus, there is a plurality of traffic queues for serving data traffic at different priorities. The queue contention parameters usually include $CW_{min}$, $CW_{max}$, AIFSN and TXOP_Limit parameters for each traffic queue. $CW_{min}$ and $CW_{max}$ are the lower and higher boundaries of a selection range from which the EDCA contention window CW is selected for a given traffic queue. AIFSN stands for Arbitration Inter-Frame Space Number, and defines a number of time slots (usually 9 μs), additional to a SIFS interval (the total defining the AIFS period—see FIG. 2b), the station must sense the medium as idle before decrementing the queue backoff counter associated with the traffic queue considered. TXOP_Limit defines the maximum size of a TXOP the station may request.

That means that each AC (and corresponding buffer) acts as an independent DCF contending entity including its respective queue backoff engine 211. Thus, each queue backoff engine 211 is associated with a respective traffic queue 210 for using queue contention parameters and drawing a backoff value (from CW) to initialize a respective queue backoff counter to be used to contend for access to at least one communication channel in order to transmit data stored in the respective traffic queue over an accessed communication channel.

The contention window CW and the backoff value are known as being EDCA variables.

It results that the ACs within the same communication station compete one with each other to access the wireless medium and to obtain a transmission opportunity, using the conventional EDCA access scheme as explained above for example.

Service differentiation between the ACs is achieved by setting different queue backoff parameters between the ACs, such as different $CW_{min}$, $CW_{max}$, AIFSN and/or different transmission opportunity duration limits (TXOP_Limit). This contributes to adjusting QoS.

The use of different AIFSN values (to defer the decrementing of the backoff counters), additional to the use of an on-average lower CW, makes that high priority traffic in EDCA has a higher chance to be transmitted than low priority traffic: a station with high priority traffic statistically waits a little less before it sends its packet, on average, than a station with low priority traffic.

Referring to the four AC buffers (210) shown in FIG. 2a, buffers AC3 and AC2 are usually reserved for real-time applications (e.g., voice AC_VO or video transmission AC_VI). They have, respectively, the highest priority and the last-but-one highest priority.

Buffers AC1 and AC0 are reserved for best effort (AC_BE) and background (AC_BG) traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 2b shows an example of mapping between eight priorities of traffic class (User Priorities or UP between 0-7 according to IEEE 802.1d) and the four ACs. The data frame is then stored in the buffer corresponding to the mapped AC.

Figure 2C:
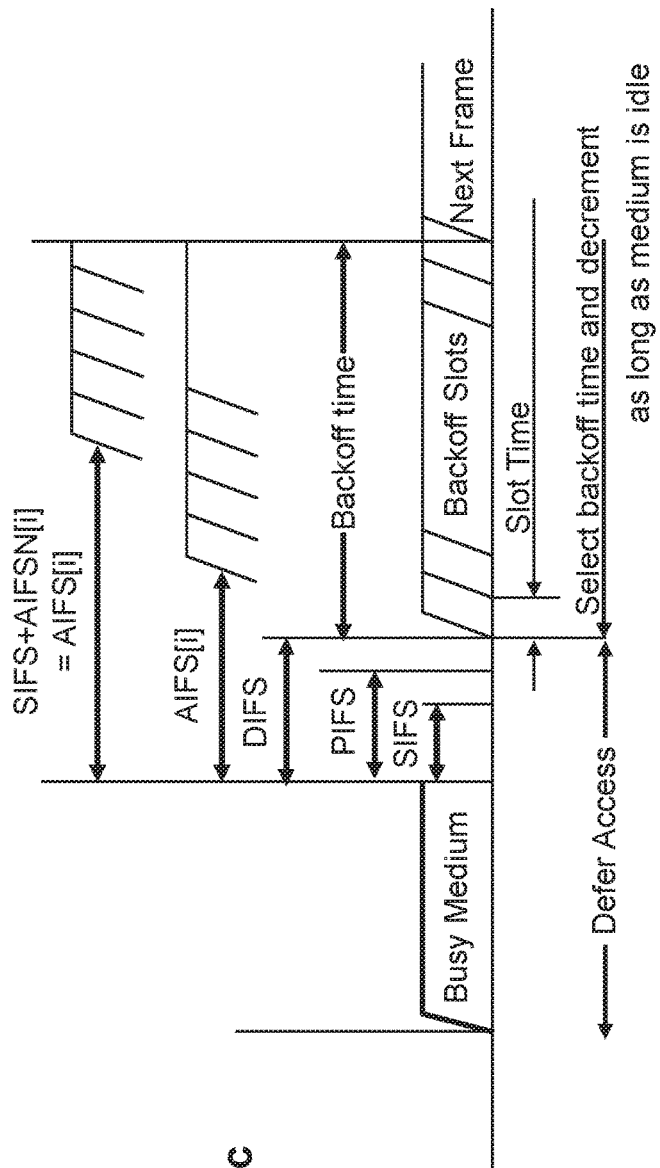
FIG. 2c illustrates 802.11e mechanism for the backoff counter countdown.

The impact of different AIFSNs is for instance shown in FIG. 2c.

Each station must wait a fixed amount of time to ensure the medium is clear before attempting transmission. With DCF, the DIFS is constant for all types of traffic. However, with 802.11e the fixed amount of time that a station has to wait will depend on the access category and is referred to as the Arbitration Interframe Space (AIFS).

Using AIFS, each traffic queue 'i' awaiting transmission must wait until the medium is declared to be available through Clear Channel Assessment (CCA) and the Network Allocation Vector (NAV), not discussed here for brevity. Once the medium is available, each traffic queue 'i' must wait the corresponding AIFS[i] period (that includes the SIFS period deferring access to the medium) before decrementing its associated queue backoff counter.

Thus, each of the four traffic queues has a defined interframe space value corresponding to the priority assigned to the queue. For example, the AC_VO queue is the highest priority and as such has the lowest interframe space timer. The AIFS timers (250) assigned by IEEE 802.11e are all defined as 1 Short Inter-Frame Spacing (SIFS) value plus a variable number of slots times (AIFSN) which are defined by the physical layer encoding method in-use (CCK, DSSS, OFDM). The values of EDCA parameter AIFS Number (AIFSN) are administrator configurable, with default values defined as the following:

AC_VO 1 SIFS+2*slot time (AIFSN=2)

AC_VI 1 SIFS+2*slot time (AIFSN=2)

AC_BE 1 SIFS+3*slot time (AIFSN=3)

AC_BG 1 SIFS+7*slot time (AIFSN=7)

The AIFSN values may be provided by the AP within a so-called EDCA Parameter Set information element (provided for example in the beacon frames sent by the AP). The AIFSN field in the Information Element is four bits long, with a minimum value of 2 defined in the standard and a maximum value of 15 based on the field length limitation.

In this manner, arbitration inter-frame spacing allows a statistical advantage for frames in higher priority traffic queues because those frames are not required, relatively to the other queues, to wait too long prior to decrementing their random backoff counters.

The Figure shows two AIFS[i] corresponding to two different traffic queues. One can see that, due to this prioritizing difference, one prioritized traffic queue starts decrementing its backoff value earlier than the other less prioritized traffic queue. This situation is repeated after each new medium access by any station in the network (i.e. upon sensing anew the medium as being free).

To initiate transmission of data, a traffic queue in a station first randomly selects a backoff value for its backoff counter. The backoff value must be within the Contention Window values defined for the traffic queue, as already mentioned above. Similar to AIFS parameter, the differences between the contention windows of various traffic queues serve to prioritize traffic in higher priority queues by allowing them to wait shorter time intervals before being allowed to transmit over the air.

Once the appropriate AIFS[i] period expires, each traffic queue can begin decrementing its queue backoff counter (251) by one at every slot time that passes.

Next, when the EDCA backoff procedure for a traffic queue (or an AC) ends (at least one backoff counter reaches zero), the MAC controller (reference 704 in FIG. 7 below) of the transmitting station transmits a data frame from this traffic queue to the physical layer for transmission onto the wireless communication network.

Since the traffic queues operate concurrently in accessing the wireless medium, it may happen that two traffic queues of the same communication station have their backoff ending simultaneously. In such a situation, a virtual collision handler (212) of the MAC controller operates a selection of the AC having the highest priority (as shown in FIG. 2b) between the conflicting ACs, and gives up transmission of data frames from the ACs having lower priorities.

Then, the virtual collision handler commands those ACs having lower priorities to start again a backoff operation using an increased CW value.

Figure 2D:
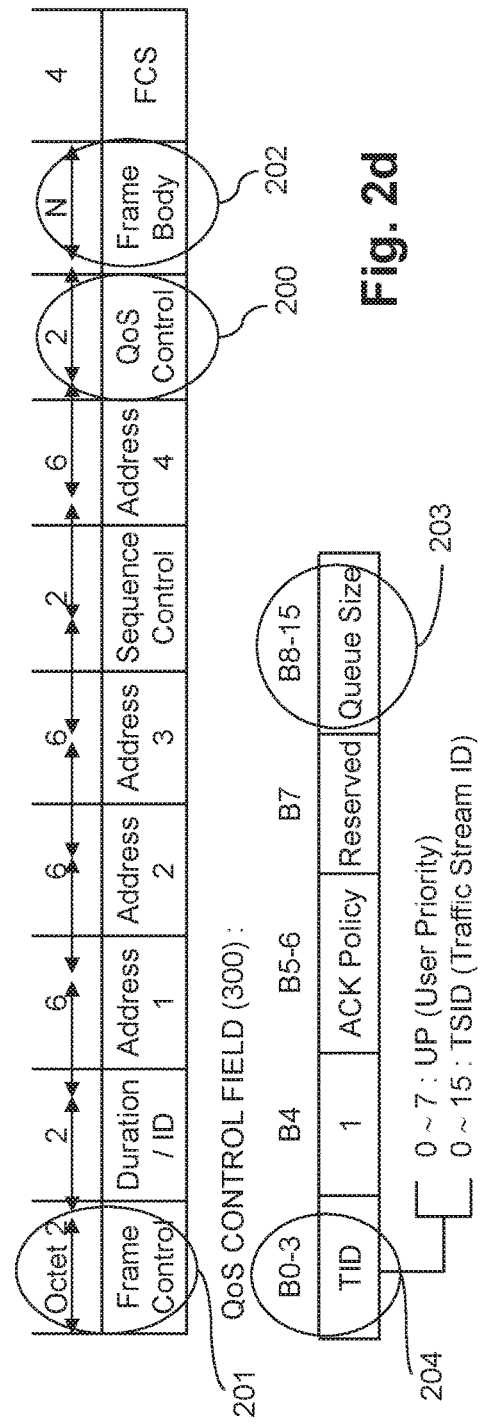
FIG. 2d illustrates the structure of a MAC data frame header.

FIG. 2d illustrates configurations of a MAC data frame and a QoS control field 200 included in the header of the IEEE 802.11e MAC frame. The MAC data frame also includes, among other fields, a Frame Control header 201 and a frame body 202. As represented in the Figure, the QoS control field 200 is made of two bytes, including the following information items:

Bits B0 to B3 are used to store a traffic identifier (TID) 204 which identifies a traffic stream. The traffic identifier takes the value of the transmission priority value (User Priority UP, value between 0 and 7—see FIG. 2b) corresponding to the data conveyed by the data frame or takes the value of a traffic stream identifier, TSID, value between 8 and 15, for other data streams;

Bit B4 is used by a non-AP station to differentiate the meaning of bits B8-B15 and is detailed here below;

Bits B5 and B6 define the ACK policy subfield which specifies the acknowledgment policy associated with the data frame. This subfield is used to determine how the data frame has to be acknowledged by the receiving station; normal ACK, no ACK or Block ACK.

Bit B7 is reserved, meaning not used by the current 802.11 standards; and

If bit B4 is set to 1, bits B8-B15 represent the "queue size" subfield 203, to indicate the amount of buffered traffic for a given TID at the non-AP station sending this frame. The queue size value is the total size, rounded up to the nearest multiple of 256 octets and expressed in units of 256 octets, of all packets buffered for the specified TID. The access point, receiving the frame, may use this information to determine the next TXOP duration it will grant to the station. A queue size of 0 indicates the absence of any buffered traffic for that TID. A queue size of 255 indicates an unspecified or unknown size for that TID 204.

Alternatively to the "queue size" usage, if bit B4 is set to 0, bits B8-B15 represent the "TXOP Duration Requested" subfield. It indicates the duration, in units of 32 µs, needed by the sending station determines for its next TXOP for the specified TID. Of course, the "TXOP Duration Requested" provides an equivalent request as the "queue size", as they both consider all packets buffered for the specified TID.

The 802.11e MAC frame format, and more particularly the QoS Control field 200, have been kept for the up and corner standard versions as now described.

Figure 3:
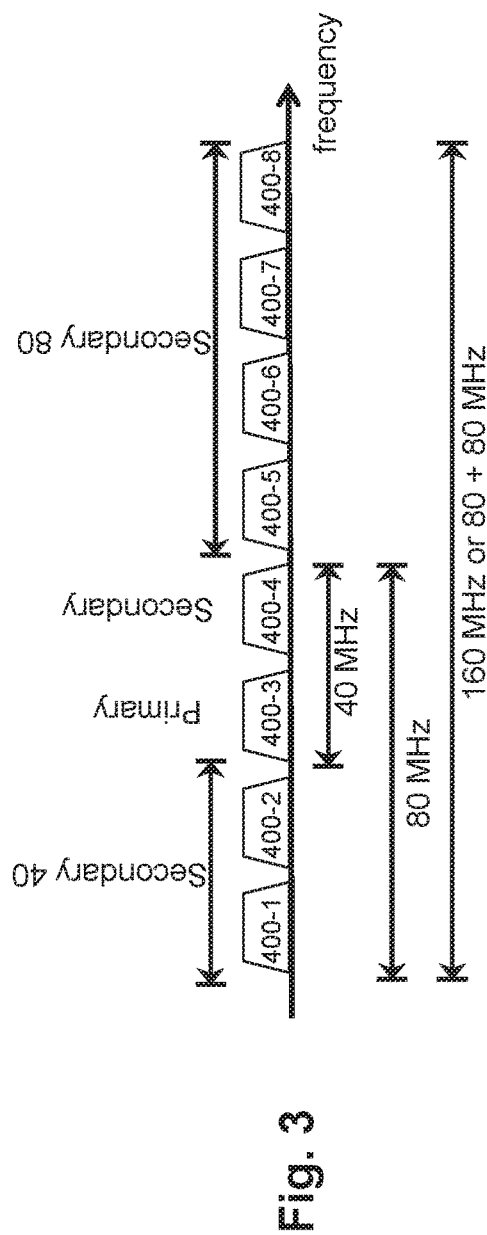
FIG. 3 illustrates 802.11ac channel allocation that supports composite channel bandwidths of 20 MHz, 40 MHz, 80 MHz or 160 MHz, as known in the art.

To meet the ever-increasing demand for faster wireless networks to support bandwidth-intensive applications, 802.11ac is targeting larger bandwidth transmission through multi-channel operations. FIG. 3 illustrates 802.11ac channel allocation that supports composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac station on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency-adjacent or contiguous 40 MHz and 20 MHz channels, respectively. However, the present invention may have embodiments with either composition of the channel bandwidth, i.e. including only contiguous channels or formed of non-contiguous channels within the operating band.

A station is granted a TXOP through the enhanced distributed channel access (EDCA) mechanism on the "primary channel" (300-3). Indeed, for each composite channel having a bandwidth, 802.11ac designates one channel as "primary" meaning that it is used for contending for access to the composite channel. The primary 20 MHz channel is common to all client stations (STAs) belonging to the same basic set, i.e. managed by or registered with the same local Access Point (AP).

However, to make sure that no other legacy station (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with an access point. In the uplink, multi-user transmissions can be used to mitigate the collision probability by allowing multiple non-AP stations to simultaneously transmit to the AP.

To actually perform such multi-user transmission, it has been proposed to split a granted 20 MHz channel (400-1 to 400-4) into at least one subchannel, but preferably a plurality of sub-channels 410 (elementary sub-channels), also referred to as sub-carriers or resource units (RUs) or "traffic channels", that are shared in the frequency domain by multiple users, based for instance on Orthogonal Frequency Division Multiple Access (OFDMA) technique.

This is illustrated with reference to FIG. 4.

In this example, each 20 MHz channel (400-1, 400-2, 400-3 or 400-4) is sub-divided in frequency domain into four OFDMA sub-channels or RUs 410 of size 5 MHz. Of course the number of RUs splitting a 20 MHz channel may be different from four. For instance, between two to nine RUs may be provided (thus each having a size between 10 MHz and about 2 MHz). It is also possible to have a RU width greater than 20 MHz, when included inside a wider composite channel (e.g. 80 MHz).

Contrary to MU downlink OFDMA wherein the AP can directly send multiple data to multiple stations (supported by specific indications inside the PLCP header), a trigger mechanism has been adopted for the AP to trigger MU uplink communications from various non-AP stations.

To support a MU uplink transmission (during a TXOP pre-empted by the AP), the 802.11ax AP has to provide signalling information for both legacy stations (i.e. non-802.11ax stations) to set their NAV and for 802.11ax client stations to determine the Resource Units allocation.

In the following description, the term legacy refers to non-802.11ax stations, meaning 802.11 stations of previous technologies that do not support OFDMA communications.

Figure 4:
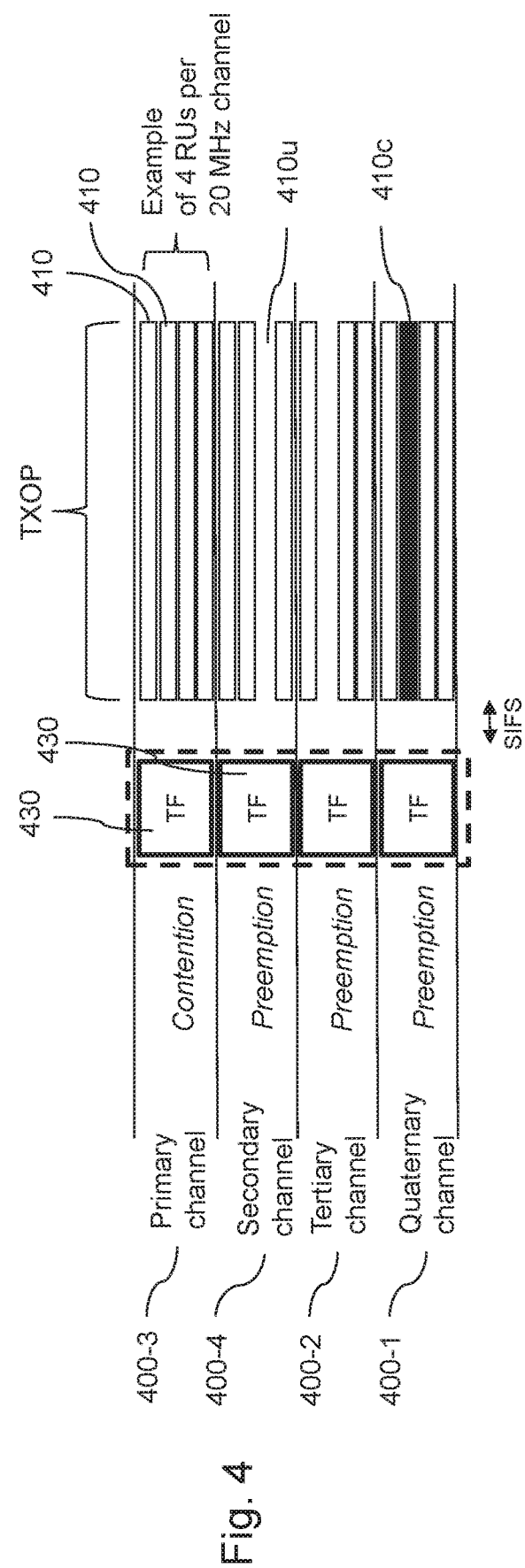
FIG. 4 illustrates, using a timeline, an example of 802.11ax uplink OFDMA transmission scheme, wherein the AP issues a Trigger Frame for reserving a transmission opportunity of OFDMA resource units on an 80 MHz channel as known in the art.

As shown in the example of FIG. 4, the AP sends a trigger frame (TF) 430 to the targeted 802.11ax stations. The bandwidth or width of the targeted composite channel is signalled in the TF frame, meaning that the 20, 40, 80 or 160 MHz value is signalled. The TF frame is sent over the primary 20 MHz channel and duplicated (replicated) on each other 20 MHz channels forming the targeted composite channel. Due to the duplication of the control frames, it is expected that every nearby legacy station receiving the TF frame (or a duplicate thereof) on its primary channel, then sets its NAV to the value specified in the TF frame. This prevents these legacy stations from accessing the channels of the targeted composite channel during the TXOP.

Based on an AP's decision, the trigger frame TF may define a plurality of resource units (RUs) 410. The multi-user feature of OFDMA allows the AP to assign different RUs to different client stations in order to increase competition. This may help to reduce contention and collisions inside 802.11 networks.

As already discussed, a RU with a width greater than 20 MHz can be defined: as example, a 996-tone RU may be offered by the AP to cover an 80 MHz communication channel, thus been equivalent in terms of capacity to a single user 80 MHz communication. One may thus note that such 80 MHz communication remains a MU UL communication within an RU in the meaning it is triggered by a trigger frame issued by the AP.

The trigger frame 430 may designate "Scheduled" RUs, which may be reserved by the AP for certain stations in which case no contention for accessing such RUs is needed for these stations. Such RUs and their corresponding scheduled stations are indicated in the trigger frame. For instance, a station identifier, such as the Association ID (AID) assigned to each station upon registration, is added in association with each Scheduled RU in order to explicitly indicate the station that is allowed to use each Scheduled RU. Such transmission mode is concurrent to the conventional EDCA mechanism, and the uplink data to be sent to AP is retrieved from the EDCA queues 210.

The trigger frame TF may also designate "Random" RUs, in addition or in replacement of the "Scheduled" RUs. The Random RUs can be randomly accessed by the stations of the BSS. In other words, Random RUs designated or allocated by the AP in the TF may serve as basis for contention between stations willing to access the communication medium for sending data. A collision occurs when two or more stations attempt to transmit at the same time over the same RU. An AID equal to 0 may be used to identify random RUs.

A random allocation procedure may be considered for 802.11ax standard based on an additional backoff counter (OFDMA backoff counter, or OBO counter or RU counter) for RU contention by the 802.11ax non-AP stations, i.e. to allow them for performing contention between them to access and send data over a Random RU. The RU backoff counter is distinct from the EDCA backoff counters 211. However data transmitted in an accessed OFDMA RUs 410 is assumed to be served from same EDCA traffic queues 210.

The RU random allocation procedure comprises, for a station of a plurality of 802.11ax stations having an positive RU backoff value (initially drawn inside an RU contention window range), a first step of determining, from a received trigger frame, the sub-channels or RUs of the communication medium available for contention (the so-called "random RUs"), a second step of verifying if the value of the RU backoff value local to the considered station is not greater than the number of detected-as-available random RUs, and then, in case of successful verification, a third step of randomly selecting a RU among the detected-as-available RUs to then send data. In case the second step is not verified, a fourth step (instead of the third) is performed in order to decrement the RU backoff counter by the number of detected-as-available random RUs.

As one can note, a station is not guaranteed to perform OFDMA transmission over a random RU for each TF received. This is because at least the RU backoff counter is decremented upon each reception of a Trigger Frame by the number of proposed Random RUs, thereby differing data transmission to a subsequent trigger frame (depending of the current value of the RU backoff number and of the number of random RUs offered by each of further received TFs).

Back to FIG. 4, it results from the various possible accesses to the RUs that some of them are not used (410u) because no station with an RU backoff value less than the number of available random RUs has randomly selected one of these random RUs, whereas some other RUs have collided (as example 410c) because at least two of these stations have randomly selected the same random RU. This shows that due to the random determination of random RUs to access, collision may occur over some RUs, while other RUs may remain free.

Once the stations have used the Scheduled and/or Random RUs to transmit data to the AP, the AP responds with a Multi-User acknowledgment (not show in the Figure) to acknowledge the data on each RU.

The MU Uplink (UL) medium access scheme, including both scheduled RUs and random RUs, proves to be very efficient compared to conventional EDCA access scheme, especially in dense environments as envisaged by the 802.11ax standard. This is because the number of collisions generated by simultaneous medium access attempts and the overhead due to the medium access are both reduced.

However, the EDCA access scheme and MU UL OFDMA/RU access scheme have to coexist, in particular to allow legacy 802.11 stations to access the medium and to allow even the 802.11ax stations to initiate communication with other non-AP stations.

Although the EDCA access scheme taken alone provides a fair access to the medium throughout all the stations, its association with the MU UL OFDMA/RU access scheme introduces a drift in fairness. This is because, compared to the legacy stations, the 802.11ax stations have additional opportunities to send data through the resource units offered in the transmission opportunities granted to the AP.

To restore some fairness between the stations, solutions have been proposed,

For instance in co-pending UK application No 1612151.9 filed on 13 Jul. 2016, a current value of at least one EDCA parameter is modified into different values (MU EDCA parameters), upon successfully transmitting data over an accessed resource unit (i.e. through UL OFDMA transmission). This is to reduce a probability for the station to access a communication channel through (conventional EDCA) contention.

In this framework, a mechanism has been proposed to reduce the station's probability of EDCA-based transmission (i.e. using the EDCA medium access scheme) as soon as the station successfully uses the MU UL mechanism to transmit its data. This reduction is made by modifying the well-known EDCA parameter set (made of AIFSN, $CW_{min}$ and $CW_{max}$).

The proposed mechanism sets each transmitting traffic queue in a MU EDCA mode (or "MU mode") in response to successfully transmitting the data in the accessed MU UL OFDMA resource unit. The setting is done for a predetermined duration, known as HEMUEDCATimer. The MU EDCA mode is a mode in which the respective EDCA parameter sets is modified into an MU parameter set, different from legacy EDCA parameter set used in a different legacy EDCA mode.

To switch from legacy EDCA contention access mode to the MU EDCA mode, the station may modify its EDCA parameter sets (AIFSN, $CW_{min}$, and/or $CW_{max}$) for all the traffic queues having successfully transmitted some data in the accessed resource unit. The switch back to the legacy EDCA mode may occur upon expiry of the HEMUEDCATimer, being noted that this timer is reset to its initial value each time the station transmits again new data (from either AC) during newly accessed resource units provided by the AP. The initializing value of HEMUEDCATimer is suggested to be high (e.g. tens of milliseconds) in order to encompass several new opportunities for MU UL transmissions.

The modified values of the EDCA parameter sets (i.e. the MU parameter sets for the four traffic queues) may be transmitted by the Access Point in a Dedicated Information Element typically sent within a beacon frame broadcasting network information to the stations.

The document provides a specific configuration which tends to make an EDCA-access to the medium less frequent for the transmitting traffic queues in the MU EDCA mode. The AP specifies this particular operating mode by indicating a specific value of the AIFSN parameter (typically 0) in the set of MU EDCA parameters. Such specific value means for the station that it shall use a very high value for its AIFSN in the MU EDCA mode, which value shall be equal to the HEMUEDCATimer as transmitted by the AP (it is reminded its value should be high, about tens of milliseconds, to be compared to less than 0.1 millisecond for the worst AIFS[i] in the legacy EDCA mode).

Unfortunately, by greatly modifying the EDCA parameters and especially the AIFSN values, the known mechanism to control the drift in fairness reduces chances for the queue backoff counters of each traffic queue in the MU EDCA mode to evolve (be decremented), thereby dropping their efficient usage in the determining of the relative priorities of the queues. Indeed, the queue backoff values thus no longer mirror which traffic queue should have the highest priority of transmission in the meaning of EDCA (e.g. with oldest data stored in it).

It is then not possible any more for a station to respect the QoS principle as described in the 802.11e standard.

Figure 5A:
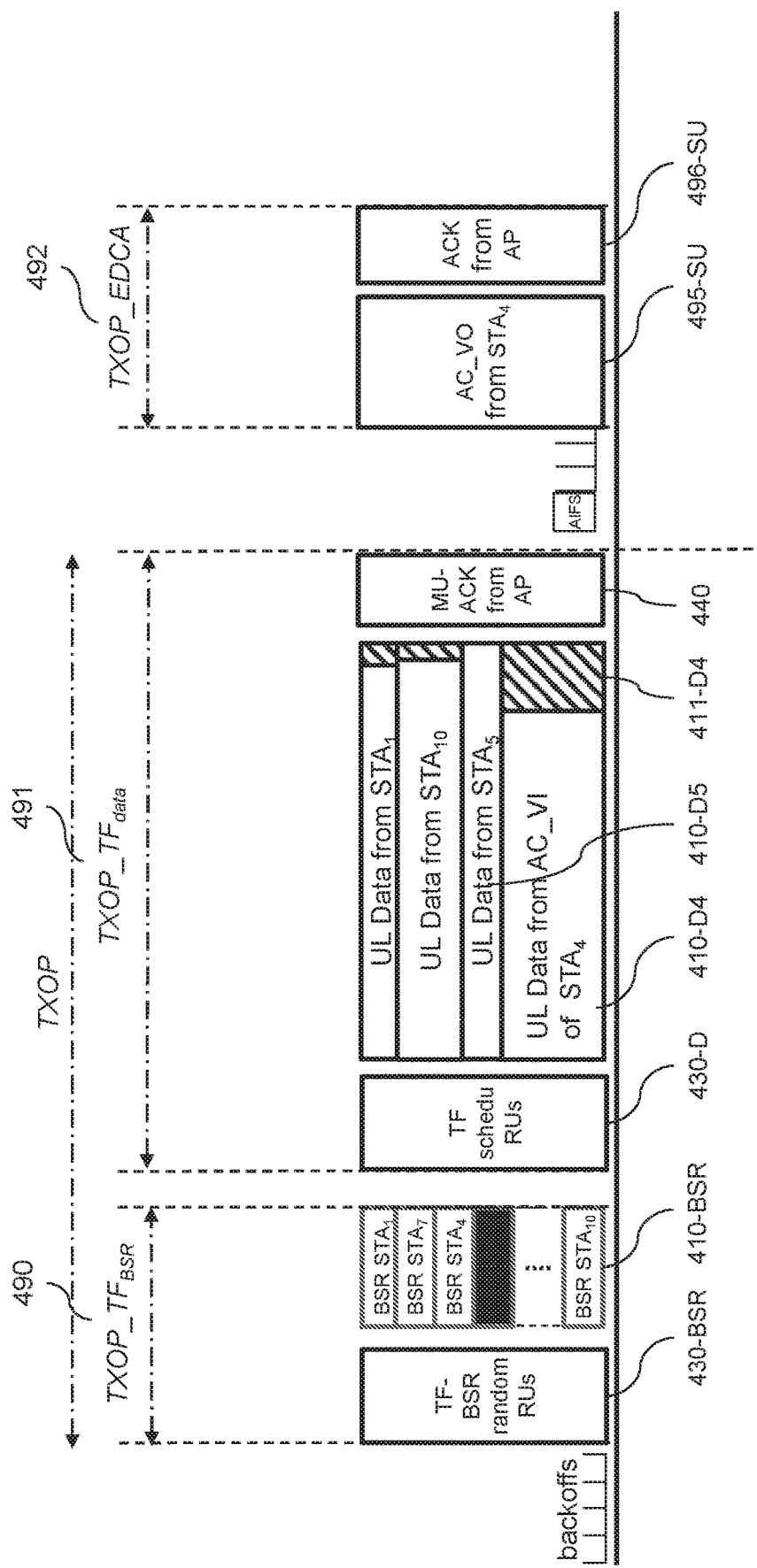
FIG. 5a illustrates an exemplary scenario showing a conventional transmission of a Trigger Frame using EDCA mechanism, wherein a penalty scheme as known in the art can be applied.

This is now illustrated with reference to FIG. 5a which describes an exemplary scenario of 802.11ax network implementing the MU EDCA mode as described in the above-mentioned document. In this scenario, a first trigger frame is sent by the AP which is fully random (meaning it only defines random RUs), followed by a second trigger frame which is fully scheduled (it only defined scheduled RUs), in order for the AP to poll the stations having uplink data.

Since the receiver, the access point, performs contention on behalf of the non-AP stations in the uplink OFDMA, the access point should be aware of both indications: which non-AP stations have uplink packets and what their buffer 210 sizes are. Indeed if non-AP stations without uplink packets are polled for uplink OFDMA transmission, then allocated resource units for MU UL OFDMA transmission are wasted, thus leading to wireless medium usage degradation.

The standard proposes that buffer status report from 802.11ax stations may be utilized to support the efficient MU UL operation by the access point. To do so, upon reception of a trigger frame 430-BSR containing a request indication of buffer status report, an 802.11ax station responds with a frame including the Queue Size subfield 203 in its QoS Control field 200. The indication of buffer status report may be, for example, a "Trigger Type" provided inside the Trigger Frame, and a specific value indicates such buffer status request. The trigger frame 430-BSR is seen as a trigger frame for Buffer Status Report (BSR) by the station.

Preferably, the trigger frame 430-BSR is broadcast by the AP in order to reach all stations of the BSS, and the, most even all, resource units are of random-type to allow all the stations to have a random opportunity to provide a queue size report. In addition, to reach a maximum of stations, the maximum number of resource units is provided by the trigger frame 430-+BSR, that is to say the widest communication channel is requested with the narrowest resource unit sizes.

In order to minimize the duration of TXOP 490 to obtain the buffer state reports, the frames sent inside resource units 410-BSR should be limited and of same size to avoiding inefficient padding. For example, a QoS_Null frame seems appropriate to offer such constraint. This specific QoS Data frame contains the QoS Control field with queue size information, but without data payload.

A current version of IEEE 802.11ax extends the usage of Queue size information 203 in a new QoS Control field, namely HE Control, and possibly in replacement of QoS Control field for 802.11ax frames, in order to inform about several, and preferably all, traffic queues 210 of the station, instead of only one as proposed in 802.11e standard.

Once the access point has obtained buffer reports for a set of stations of its BSS, it can specifically poll them through scheduled resource unit allocation. This allocation is transmitted using a trigger frame 430-D for data transmission. Then, the stations with allocated resource units emits their buffered data during a longer $\text{TXOP\_TF}_{data}$ 491 and inside their allocated resource unit 410-D. As the MU UL/DL OFDMA transmissions on all the resource units of the composite channel should be aligned in time, the station may provide padding payload 411-D in case of no more data can be sent inside the assigned resource unit. This may happen, for example, if no more data is buffered for transmission, or if the emitting station does not want to fragment any remaining data frame.

The access point is able to manage the resource unit size according to the reported station needs. The access point may schedule the resource unit(s) during the TXOP period to any of the stations having sent a report.

Once the stations have used the resource units 410-D to transmit data to the access point, the access point responds with a Multi-User acknowledgment 440 to acknowledge the data on each resource unit. This ACK ends the granted TXOP period.

Due to the polling by the AP of a given traffic queue and subsequent OFDMA transmission of data from that traffic queue, the latter may switch to the MU EDCA mode with AIFSN set to HEMUEDCATimer. Only the other traffic queues (not transmitting) are still able to access the communication channel using EDCA scheme.

In a case where the AIFSN value provided by the AP (e.g. in the EDCA Parameter Set information of a beacon frame) is zero, data of an access category for which EDCA-access to the wireless network is gained are not transmitted over the wireless network. This prevents the station's traffic queues in MU EDCAC mode to access the medium.

In this example shown in the Figure, station STA4 has been polled by the AP for transmission of data from traffic queue AC_VI (slot 410-D4). Due to the switching to the MU EDCA mode, traffic queue AC_VI is no longer able to request an EDCA access as long as the HEMUEDCATimer has not expired. However, station STA4 can still request EDCA access for the other traffic queues (until they are served in a next MU UL transmission if it appears). This is why traffic queue AC_VO, in the legacy EDCA mode, can actually access the communication channel using EDCA access, and then empties itself via a single user transmission 495-SU (this is TXOP 492).

Figure 5B:
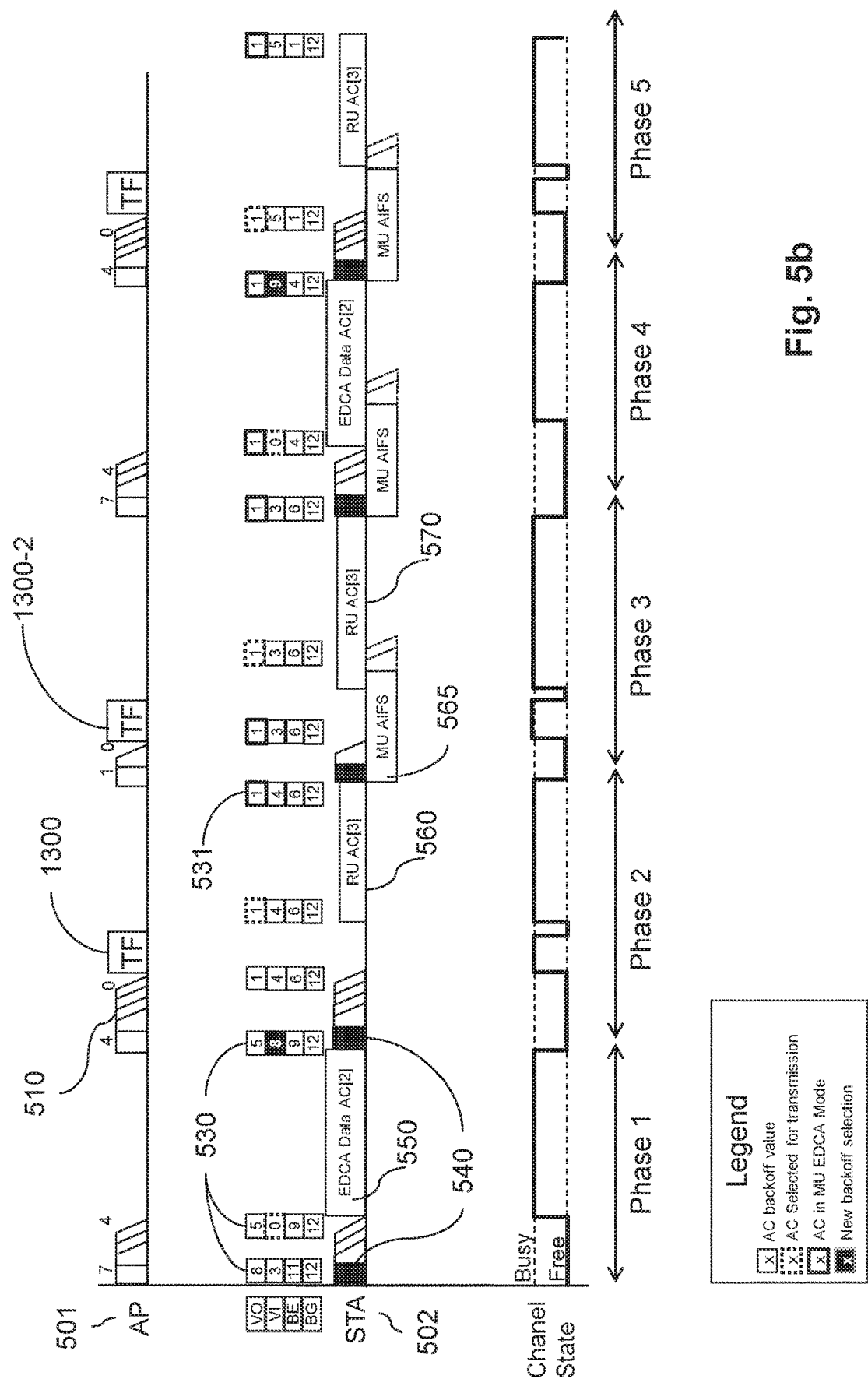
FIG. 5b illustrates an exemplary evolution of the backoff counters and associated data selection as known in the prior art.

FIG. 5b further details the penalty mechanism described above.

In this Figure, the four values 530 represent the queue backoff counters BC[AC] (and their backoff values) associated with the four traffic queues 210. A graphical code is used to distinguish between the different states in which the queue backoff counters may be. The graphical code is provided as a legend directly in the Figure.

In the first phase shown (each phase correspond to a period from when the network becomes available until the end of a granted TXOP), station 502 accesses the medium through EDCA when BC[VI] reaches zero (counter in a dashed line box), while the best queue backoff value of AP 501 only reaches 4. The black portions 540 before decrementing the queue backoff values correspond to the AIFS [AC] (the different sized thereof not being shown).

Then, video data from AC[2] (i.e. the traffic queue of AC_VI) are sent during the granted TXOP 550. A new queue backoff value is drawn for AC_VI (white figure in black box).

In the second phase, AP 501 accesses first the network after its AIFS 540 and the countdown of its backoff value 710, and then sends a trigger frame 1300. The TF 1300 provides at least one scheduled RU for station 502.

Figure 13:
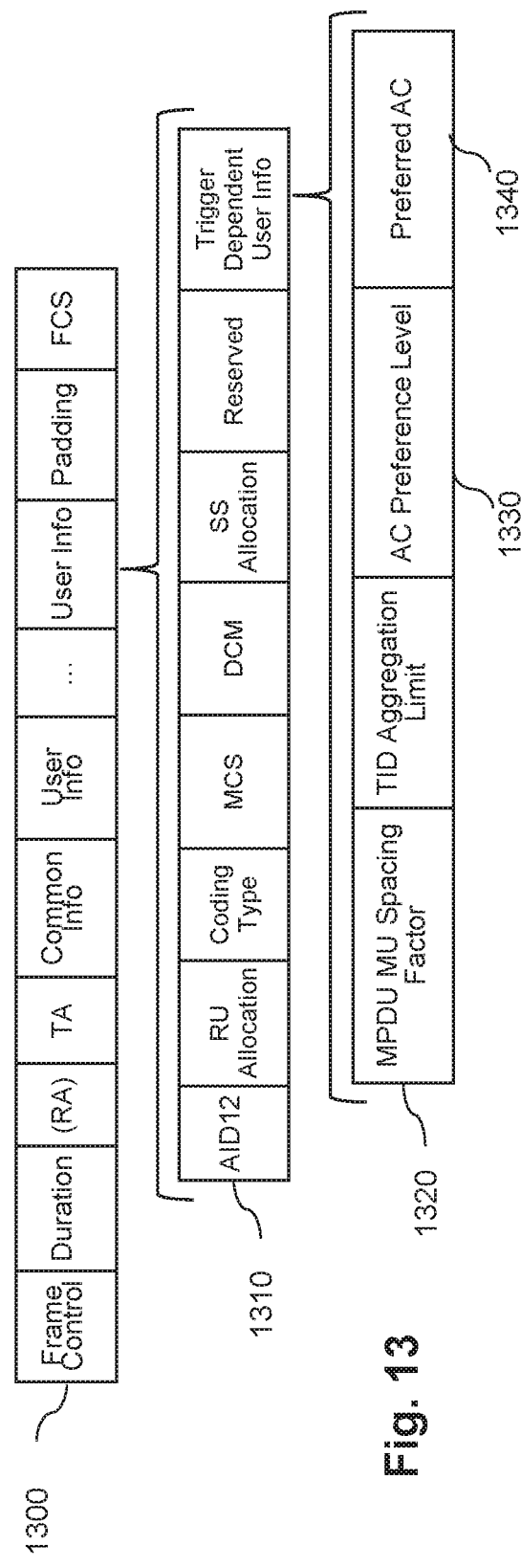
FIG. 13 illustrates the structure of a trigger frame as defined in the 802.11ax standard.

The TF 1300 does not indicate any preferred AC in corresponding fields (preferred AC level field 1330 shown in FIG. 13 set to 0). So, station 502 needs to determine which AC queue has the highest priority to select corresponding data for MU UL OFDMA transmission.

To do so, station 502 selects the AC queue with the lowest current backoff counter value. In the present example, the first AC queue (corresponding to the VO queue) is selected since its associated queue backoff value equals 1 (compared to 4, 6 and 12 for the other AC queues).

Data from AC_VO can thus be transmitted (560) in the accessed resource unit

After successful MU UL OFDMA transmission 560 of the data, the corresponding traffic queue enters the MU EDCA mode, wherein the EDCA parameter set of this transmitting traffic queue, here AC_VO, is modified with a set of MU values. The traffic queues in MU EDCA mode are shown in the Figure using thick line boxes.

During this second phase, the queue backoff counter 531 associated with the transmitting traffic queue AC_VO is frozen, meaning it is not updated and keeps its previous value, here '1'.

The third phase thus starts with station 502 entering in deferred transmission state, by waiting for the end of the AIFS[i] timers (565) before decrementing the queue backoff values BC[i] 530.

For the traffic queues in MU EDCA mode with more restrictive EDCA parameters, such as a very high AIFSN, the modified value of the AIFS 565 makes the decrementing of the corresponding queue backoff values BC[AC] less frequent. So when AP 501 sends a new trigger frame 1300-2 upon EDCA-based accessing the medium, station 502 to which a new scheduled RU is offered determines which traffic queue has the lowest current queue backoff value.

Again, this is BC[3] with the backoff value 1. It means that station 502 transmits (570) again data from AC_VO in the accessed RU.

After a while, if several, particularly if all traffic queues entered the MU EDCA mode, the associated queue backoff values are blocked. Priority is thus always given to the same traffic queue for MU UL OFDMA transmission. The backoff-based QoS requirement is no longer satisfied.

The lack of dynamicity of the backoff counters due to their freezing in case of MU UL OFDMA transmissions should be restored so that they still efficiently mirror the relative priorities of the AC queues. Advantageously, the restoring should maintain a penalty scheme to reduce EDCA-based transmission probability for the AC queues in the MU EDCA mode, and also should keep the principle of evolution of the backoff counters.

It is within this framework that the present invention proposes to keep the decrementing of the queue backoff counters, in particular by not penalizing the AIFSNs of the AC queues, while introducing reactive counter-measures upon the backoff counters expiring.

It is recalled that the queue backoff counters are decremented over time as long as the communication channel is sensed as idle by a station during more than respective arbitration interframe space durations; and any traffic queue is switched from a legacy contention mode to an MU contention mode upon transmitting data stored in the traffic queue, in an accessed resource unit provided by the access point within a transmission opportunity granted to the access point on the communication channel.

To efficiently restore the dynamicity of the backoff counters while keeping a penalty scheme, the present invention thus proposes for the station, upon one of the queue backoff counters expiring, to determine, based on the current mode of the associated traffic queue, whether to access the communication channel to transmit data stored in the associated traffic queue, or to draw a new backoff value to reset the expiring queue backoff counter without having data from the associated traffic queue being transmitted in the communication channel.

In practice, if the current mode is the legacy contention mode, the station accesses the communication channel to transmit data stored in the associated traffic queue. This is the legacy EDCA scheme. Otherwise, if the current mode is the MU contention mode, the new backoff value is drawn to reset the expiring queue backoff counter, without having data from the associated traffic queue being transmitted in the communication channel.

Slight variants may be envisioned, such as also basing the determining of whether to access the communication channel or to draw a new backoff value, on the data currently stored in the associated traffic queue. For instance to apply the penalty of not transmitting data even if the backoff counter expires, only if no data intended to a non-AP station is stored in the associated AC queue under MU EDCA mode.

The reinstated decrementing of the backoff counters of non-transmitting AC queues in the MU Mode guaranties the restoring of the aging feature of the EDCA backoff counters, and thus of the QoS. So the double function of the EDCA backoffs is restored and allows to apply a relative QoS priority among the AC queues at the station.

In addition, the reactive counter-measure of resetting an expiring backoff counter without transmitting data in case of MU mode ensures a penalty is still applied to the AC queues in such MU mode, to reduce EDCA accesses.

The present invention thus acts in an opposite way as the known techniques, which are basically preventive measured to avoid having the backoff counters to reach zero to ensure reduction of EDCA accesses.

As will further become apparent, the method of this invention is easier to implement within a standard environment, and especially in the transmission state machine of 802.11 device.

Figure 5C:
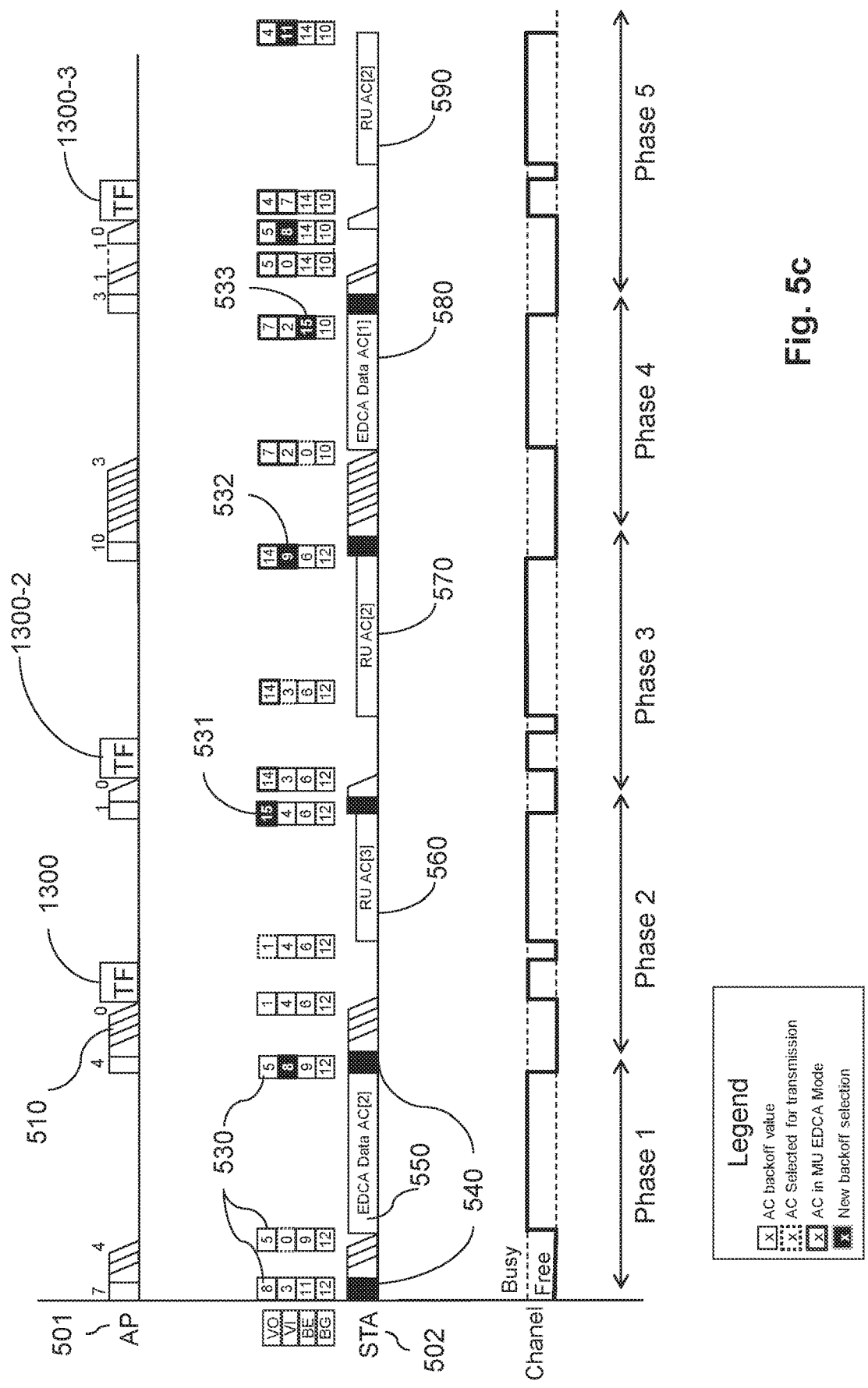
FIG. 5c illustrates the evolution of the backoff counters and the associated data selection according to embodiments of the invention.

The result of one implementation of the present invention is now illustrated with reference to FIG. 5c which describes, with the same sequence as in FIG. 5b, the restoring of QoS through relative EDCA-based priorities between the ACs.

The first phase remains unchanged.

During the second phase, station 502 receives TF 1300 from AP 501. The AC queue selection algorithm in the station determines that traffic queue AC_VO has the highest priority due to a lowest queue backoff value (as in the example of FIG. 5b). The MU UL OFDMA transmission occurs with data from AC_VO (AC[3]).

After successful transmission 560 of the data in the accessed RU, AC_VO enters the MU EDCA mode (backoff value in a thick line box), and embodiments of the present invention propose to select a new backoff value 531 (white figures in a black box, here having the value '15') for the transmitting traffic queue AC_VO, from the current and unchanged associated contention window.

Also, AIFS[AC_VO] is not changed when entering the MU EDCA mode. It means that the penalty due to the MU mode is not performed through degradation of the EDCA parameters.

Next, in the third phase, the backoff counters are decremented given their respective AIFS. Here the backoff counter 531 of AC_VO is decremented by 1 each time slot where the medium is sensed as free, even if AC_VO is in the MU mode. This is obtained thanks to the value AIFS[AC_VO] which has not been modified (or very slightly penalized in some embodiments).

Again, station 502 receives TF 1300-2 from AP 501. The AC queue selection algorithm in the station determines that traffic queue AC_VI has the highest priority due to a lowest queue backoff value (because BC[VO] is now with a value 14) The MU UL OFDMA transmission in an accessed RU thus happens with data from AC_VO.

One may note that, compared to FIG. 5b, another traffic queue is solicited for the MU UL OFDMA transmission in the third phase, thanks to the new backoff value 532 drawn to reset the backoff counter of AC_VO. Thus, the relative priorities between the traffic queues are reinstated for the OFDMA transmitting traffic queues.

After successful transmission 570 of the data in the accessed RU, AC_VI also enters the MU EDCA mode (backoff value in a thick line box; while AC_VO is already in the MU EDCA mode), and a new backoff value 532

(white figures in a black box, here having the value '9') is drawn for the transmitting traffic queue AC_VI, from the contention window.

Next, in the fourth phase, the medium is sensed as idle and the backoff counters are decremented given their respective AIFS. Here the backoff counter 531 of AC_VO goes from 14 to 7, while the one 532 of AC_VI goes from 9 to 2, even if the two AC queues are in the MU mode.

Simultaneously, the backoff counter of AC_BE expires, thereby resulting in a transmission of data from AC_BE (580). A new backoff value '15' is drawn for the expiring backoff counter 533.

Next, in the fourth phase, the medium is sensed as idle and the backoff counters are decremented given their respective AIFS. Here, during the two first time slots after the SIFS period, the backoff counter 531 of AC_VO goes from 7 to 5, while the one 532 of AC_VI expires.

As traffic queue AC_VO is currently in the MU mode, a new backoff value ('8' in the example) is drawn to reset the expiring queue backoff counter 532 without having data from the associated traffic queue being transmitted in the communication channel. As a consequence, the decrementing of the backoff counters continues (in fact it never stops), in particular the one of the AP which expires in turn. Station 502 thus receives a new TF 1300-3 from AP 501, and the AC queue selection algorithm in the station may be performed.

For instance the station determines that traffic queue AC_VO has the highest priority due to a lowest queue backoff value (because BC[VI] has been reset in the meantime). The MU UL OFDMA transmission 590 in an accessed RU thus happens with data from AC_VO.

However, in embodiments, the resetting of any AC queue in the MU mode may be saved and this information be used to select the data to be transmitted. For instance, a reset flag (not shown in the Figure) may be associated with each traffic queue, which is enabled (i.e. set to TRUE) each time a new backoff value is drawn to reset the associated queue backoff counter without having data from the traffic queue being transmitted (i.e. when the AC queue is in the MU mode). This is for instance the case for traffic queue AC_VI during the fifth phase (it was reset with a new backoff value '8').

In that case, the station determines that traffic queue AC_VI has a reset flag set to TRUE when receiving TF 1300-3. The MU UL OFDMA transmission in an accessed RU thus happens with data from AC_VI (AC[2] as shown in the example of the Figure). It means that data transmitted in a resource unit provided by the access point within a transmission opportunity granted to the access point are retrieved from at least one traffic queue selected based on the enabled or disabled status of the reset flags associated with the traffic queues. In particular, data transmitted in a resource unit 590 provided by the access point within a transmission opportunity granted to the access point are retrieved from a traffic queue having an enabled reset flag.

On the other hand, the reset flag is disabled (i.e. set to FALSE) each time data from the traffic queue are transmitted. In the example, the reset flag of AC_VI is reset after successful transmission 590.

According to the embodiments shown in the Figure, a new backoff value is drawn for backoff counter 531 associated with the transmitting traffic queue AC_VI (white figures in a black box, here having the value '11').

This exemplary scenario clearly shows that the full functional behavior of the EDCA backoffs, and thus QoS, are restored, in particular dynamic relative EDCA-based priorities between the traffic queues are reinstated.

Figure 6:
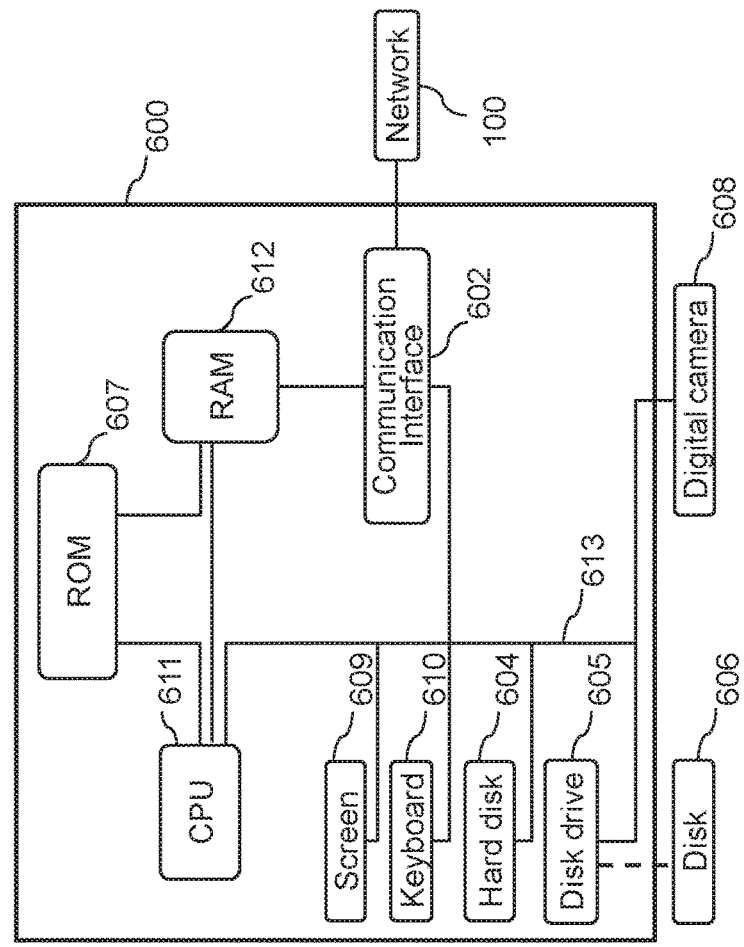
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
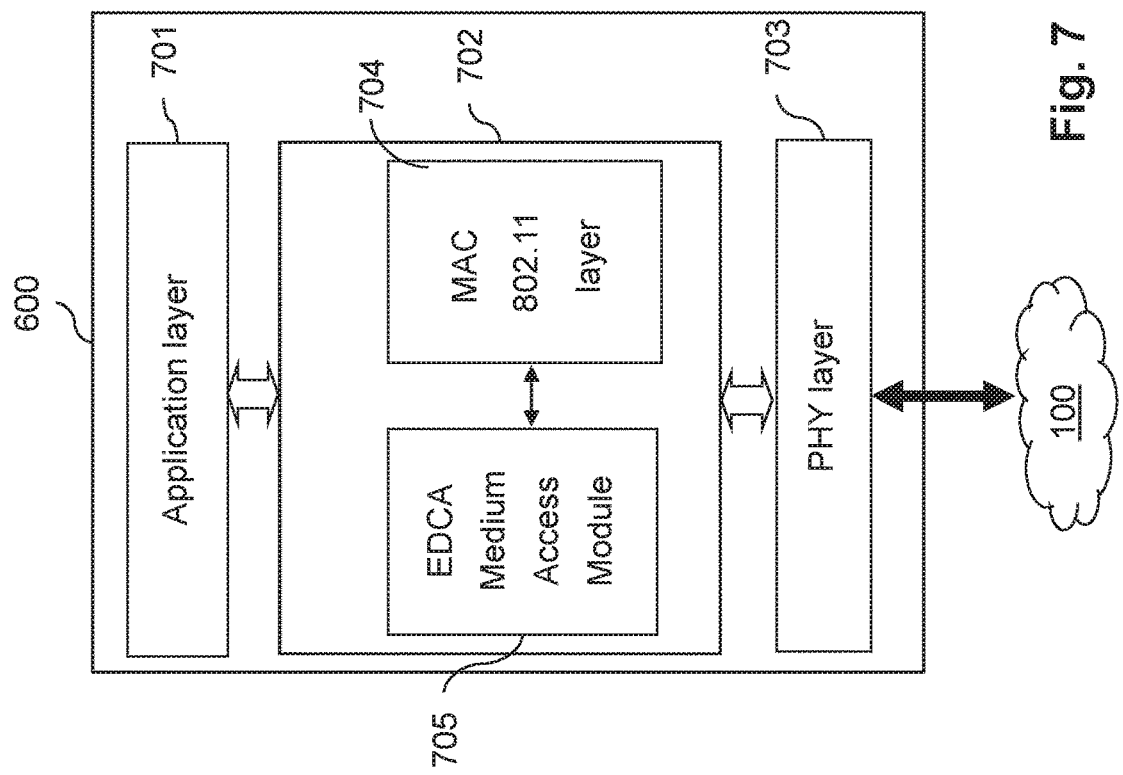
FIG. 7 shows a block diagram schematically illustrating the architecture of a wireless communication device in accordance with embodiments of the present invention.

FIG. 7 is a block diagram schematically illustrating the architecture of the communication device or node 600, in particular, one of stations 100-107, adapted to carry out, at least partially, the invention. As illustrated, station 600 comprises a physical (PHY) layer block 703, a MAC layer block 702, and an application layer block 701.

The PHY layer block 703 (e.g. a 802.11 standardized PHY layer) has the task of formatting, modulating on or demodulating from any 20 MHz channel or the composite channel, and thus sending or receiving frames over the radio medium used 100, such as 802.11 frames, for instance single-user frames, such as control frames (RTS/CTS/ACK/Trigger Frame), MAC data and management frames, based on a 20 MHz width to interact with legacy 802.11 stations or with 802.11ax in legacy mode (such as for Trigger Frames), as well as MAC data frames of OFDMA type having preferably smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and one additional block 705 for carrying out, at least partially, embodiments of the invention. The MAC layer block 702 may optionally be implemented in software, which software is loaded into RAM 612 and executed by CPU 611.

Preferably, the additional block, referred to as EDCA medium access module 705 implements the part of the invention that regards station 600, i.e. memorization of that the 'MU mode' is established for a given AC once this AC is offered a successful transmission in a Resource Unit, continuing the decrementing of each backoff counter of the AC(s) regardless of the contention mode of the associated traffic queues (in particular no matter it is in the MU mode), optionally memorizing when a backoff counter in MU mode is reset, and also preventing an EDCA medium access once an AC backoff in MU mode is down to zero.

MAC 802.11 layer 704 and EDCA medium access module 705 interact one with the other in order to provide management of the dual modes (single user EDCA and multi user UL OFDMA) as described below.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments. Although the proposed examples use the trigger frame 430 (see FIG. 4) sent by an AP for a multi-user uplink transmissions, equivalent mechanisms can be used in a centralized or in an ad-hoc environment (i.e. without an AP). It means that the operations described below with reference to the AP may be performed by any station in an ad-hoc environment.

These embodiments are mainly described in the context of IEEE 802.11ax by considering OFDMA resource units. Application of the invention is however not limited to the IEEE 802.11ax context.

Also the present invention does not necessarily rely on the usage of a MU access scheme as described in 802.11ax. Any other RU access scheme defining alternate medium access schemes allowing simultaneous access by the stations to same medium can also be used.

Figure 8:
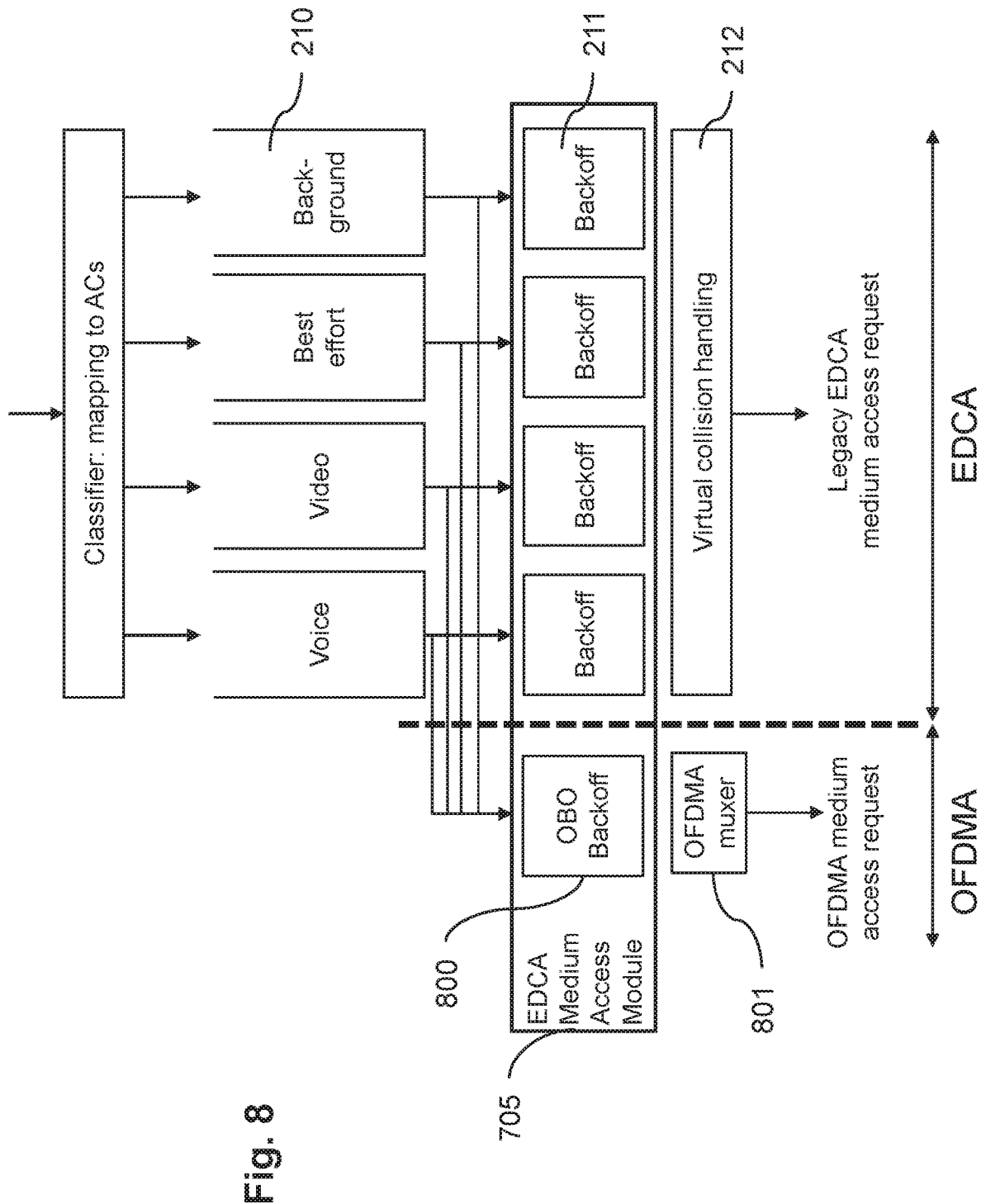
FIG. 8 illustrates an exemplary transmission block of a communication station according to embodiments of the invention.

FIG. 8 illustrates an exemplary transmission block of a communication station 600 according to embodiments of the invention.

As mentioned above, the station includes a channel access module and possibly an RU access module, both implemented in the MAC layer block 702. The channel access module includes:

a plurality of traffic queues 210 for serving data traffic at different priorities;

a plurality of queue backoff engines 211, each associated with a respective traffic queue for using a set of EDCA parameters, in particular to compute a respective queue backoff value, to be used by an associated backoff counter to contend for access to at least one communication channel in order to transmit data stored in the respective traffic queue. This is the EDCA access scheme.

The RU access module includes an RU backoff engine 800 separate from the queue backoff engines, for using RU contention parameters, in particular to compute an RU backoff value, to be used by an RU backoff counter to contend for access to the OFDMA random resource units defined in a received TF (sent by the AP for instance), in order to transmit data stored in either traffic queue in an OFDMA RU. The RU backoff engine 800 is associated with a transmission module, referred to as OFDMA muxer 801. For example OFDMA muxer 801 is in charge, when the RU backoff value described below reaches zero, of selecting data to be sent from the AC queues 210.

The conventional AC queue back-off registers 211 drive the medium access request along EDCA protocol (channel contention access scheme), while in parallel, the RU backoff engine 800 drives the medium access request onto OFDMA multi-user protocol (RU contention access scheme).

As these two contention access schemes coexist, the station implements a medium access mechanism with collision avoidance based on a computation of backoff values:

a queue backoff counter value corresponding to a number of time-slots the station waits (in addition to an AIFS period), after the communication medium has been detected to be idle, before accessing the medium. This is EDCA, regardless of whether it is in a degraded or non-degraded state;

an RU backoff counter value corresponding to a number of idle random RUs the station detects, after a TXOP has been granted to the AP or any other station over a composite channel formed of RUs, before accessing the medium. This is OFDMA. A variant to counting down the RU backoff counter based on the number of idle random RUs may be based on a time-based countdown.

Figure 9:
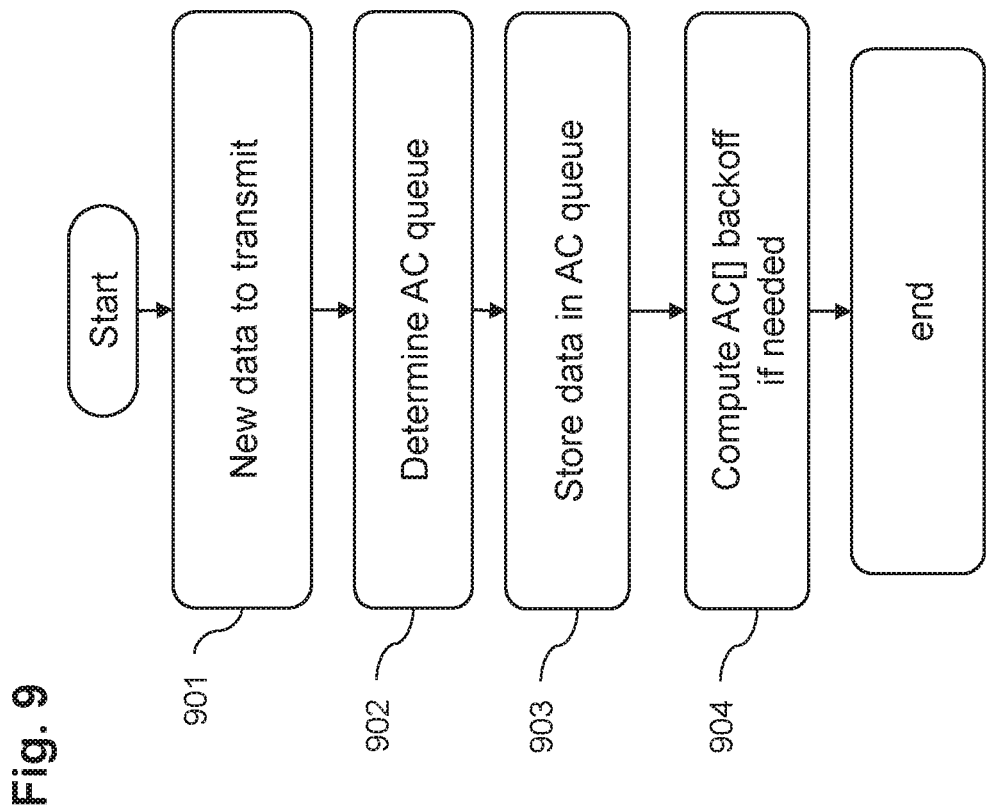
FIG. 9 illustrates, using a flowchart, main steps performed by a MAC layer of a station, when receiving new data to transmit, in embodiments of the invention.

FIG. 9 illustrates, using a flowchart, main steps performed by MAC layer 702 of station 600, when receiving new data to transmit (MSDU packet from upper layer, e.g. application layer 701). It illustrates a conventional FIFO feeding in 802.11 context.

At the very beginning, none traffic queue 210 stores data to transmit. As a consequence, no queue backoff value 211 has been computed. It is said that the corresponding queue backoff engine or corresponding AC (Access Category) is inactive. As soon as data are stored in a traffic queue, a queue backoff value is computed (from corresponding queue backoff parameters), and the associated queue backoff engine or AC is said to be active.

When a station has data ready to be transmitted on the medium, the data are stored in one of the AC queue 210, and the associated backoff 211 should be updated.

Details are now provided.

At step 901, new data are received from an application local running on the device (from application layer 601 for instance), from another network interface, or from any other data source. The new data are ready to be sent by the station.

At step 902, the station determines in which AC queue 210 the data should be stored. This operation is usually performed by checking the TID (Traffic Identifier) value attached to the data (according to the matching shown in FIG. 2b).

Next, step 903 stores the data in the determined AC queue. It means the data are stored in the AC queue having the same data type as the data.

At step 904, conventional 802.11 AC backoff computation is performed by the queue backoff engine associated with the determined AC queue.

If the determined AC queue was empty just before the storage of step 903 (i.e. the AC is originally inactive), then there is a need to compute a new queue backoff value for the corresponding backoff counter.

The station thus computes the queue backoff value as being equal to a random value selected in range [0, CW], where CW is the current value of the CW for the Access Category considered (as defined in 802.11 standard and updated for instance according to some embodiments of the invention as described in step 1080 below). It is recalled here that the queue backoff value will be added to the AIFS in order to implement the relative priorities of the different access categories. CW is a congestion window value that is selected from selection range [$CW_{min}$, $CW_{max}$], where both boundaries $CW_{min}$ and $CW_{max}$ depends on the Access Category considered.

As a result, the AC is made active.

The above parameters CW, $CW_{min}$, $CW_{max}$, AIFSN, and Backoff value form the EDCA contention parameters and variables associated with each AC. They are used to set the relative priorities to access the medium for the different categories of data.

The EDCA parameters have usually a fixed value (e.g. $CW_{min}$, $CW_{max}$, and AIFSN), while the EDCA variables (CW and backoff value) evolve over time and medium availability. As readily apparent from the above, thanks to the present invention provides, the EDCA parameters no longer need to be degraded when applying the penalizing MU mode. Of course, they may still be modified, but it is not necessary.

In addition, random access procedure for UL RU OFDMA (as previously described) may be supported by the station: in that case, step 904 may include computing the RU backoff value if needed. An RU backoff value needs to be computed if the RU backoff engine 800 was inactive (for instance because there were no data in the traffic queues until previous step 903) and if new data to be addressed to the AP have been received.

The RU backoff value may be computed in a similar fashion as the EDCA backoff value, i.e. using dedicated RU contention parameters, such as a dedicated contention window [0, CWO] and a selection range [$CWO_{min}$, $CWO_{max}$].

Note that some embodiments may provide distinction between data that can be sent through resource units (i.e. compatible with MU UL OFDMA transmission) and those that cannot. Such decision can be made during step 902, and a corresponding marking item can be added to the stored data.

In such a case, the RU backoff value is computed only if the newly stored data are marked as compatible with MU UL OFDMA transmission (either scheduled or random).

Next to step 904, the process of FIG. 9 ends.

Once data are stored in the AC queues, the station may access the medium either directly through EDCA access scheme as illustrated below with reference to FIG. 10, or through resource units provided by the AP through one or more trigger frames, as illustrated below with reference to FIG. 11.

Figure 10:
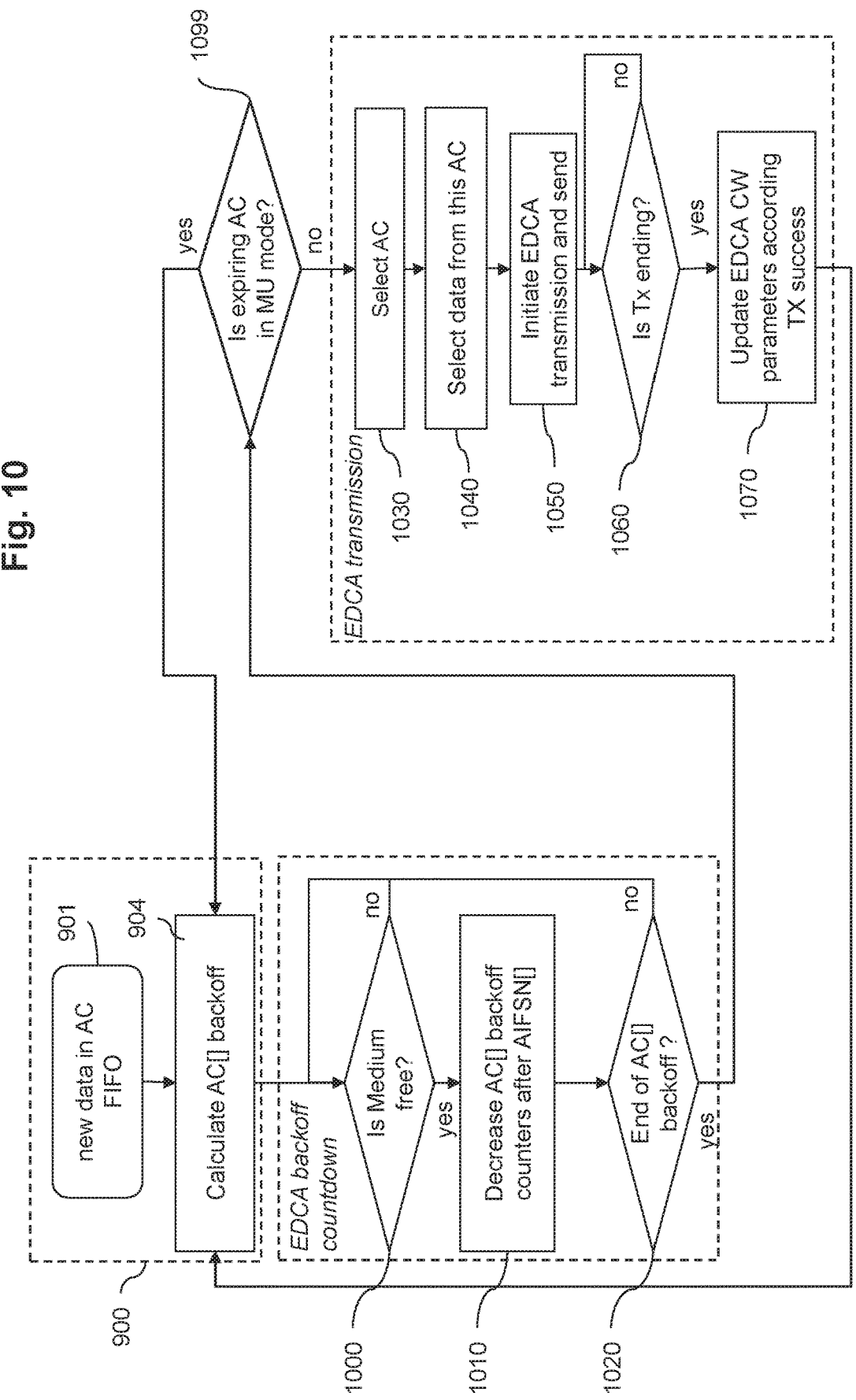
FIG. 10 illustrates, using a flowchart, steps of accessing the medium based on the EDCA medium access scheme, according to embodiments of the invention.

FIG. 10 illustrates, using a flowchart, steps of accessing the medium based on the conventional EDCA medium access scheme, intended to handle both legacy and MU contention modes according to embodiments the invention. In particular the reactive counter-measure of the invention is, in this example, implemented in step 999 by non-AP station 600.

For the sake of clarity, steps of FIG. 9 are also drawn. This is because the data storage in AC[ ] queue is a prerequisite of any EDCA medium access tentative.

Steps 1000 to 1020 describe a conventional waiting introduced in the EDCA mechanism to reduce the collision on a shared wireless medium, based on backoff counting down. In step 1000, station 600 senses the medium waiting for it to become available (i.e. detected energy is below a given threshold on the primary channel).

When the medium becomes free during an AIFS[i] period (at least DIFS period, see FIG. 2d) plus one slot time, step 1010 is executed in which station 600 starts decrementing all the active (non-zero) AC[ ] queue backoff counters 211 by one. In other words, the station decrements the queue backoff values each elementary time unit the communication channel is detected as idle.

Next, at step 1020, station 600 determines if at least one of the AC backoff counters reaches zero.

If no AC queue backoff reaches zero, station 600 waits for another backoff timeslot (typically 9 μs), and thus loops back to step 1000 in order to sense the medium again during the next backoff timeslot. This makes it possible to decrement the AC backoff counters at each new backoff timeslot when the medium is sensed as idle, as soon as their respective AIFS[i] have expired.

If at least one AC queue backoff reaches zero (which occurs three times in the scenario of FIG. 5c), conventional step 1030 to start the EDCA transmission phase is not automatically reached.

According to the invention, the station shall determine, based on the current mode of the traffic queue associated with the expiring queue backoff counter, whether to access the communication channel to transmit data stored in the associated traffic queue (through the conventional EDCA process starting from step 1030), or to draw a new backoff value to reset the expiring queue backoff counter without having data from the associated traffic queue being transmitted in the communication channel (this is one improvement of the invention, restoring the dynamicity of the backoff counters in MU mode).

This determining step is implemented, in the proposed embodiments, through step 1099, which thus modifies the usual behavior of EDCA state machine for the purpose of applying the penalty of EDCA medium access for a non-AP station 600 in the MU mode.

New test 1099 thus determined whether the traffic queue associated with the expiring queue backoff counter is in the penalizing MU mode or not. The traffic queue may have been flagged with a 'MU Mode" set to 1 (performed by step 1140 as further explained below), letting station 600 easily know that the traffic queue is under penalty mode for EDCA medium access.

One main advantage of this approach is to still be able to reuse the hardware/state-machine of a standard backoff decrementing mechanism, in particular the basic mechanism that finally enables, when a backoff counter reaches zero, to initiate a medium access request. With the present invention, this request is simply conditional to the usage mode (MU Mode on or off). New test 1099 can be easily implemented in hardware.

In case of positive determination at test 1099 (current mode is in the MU mode), the station will defer any EDCA medium attempt. As a result, a new backoff value is drawn by looping back to step 904 to reset the expiring backoff counter, without having data being transmitted through EDCA access. This step thus reintroduces EDCA backoff management regardless of the "MU mode".

In case of resetting, the reset flag associated with the traffic queue concerned (as introduced above when describing the scenario of FIG. 5c) can be enabled, to memorize the fact that this traffic queue had the highest QoS before the reset. This flag will be used in step 1030 to select the most priority data for OFDMA transmission.

Note that the EDCA parameters/variables, $CW_{min}$, $CW_{max}$ and current CW, do not need to be modified when test 1099 leads to redraw a backoff value without EDCA transmission. This is because, as there is no EDCA transmission allowed, nothing new is known about the EDCA medium conditions (basically, those values evolve according to correct behavior of an EDCA transmission). So any update of those values is meaningless and useless.

Optionally, these EDCA parameters/variables may be updated only when a lot of time has been spent by a corresponding traffic queue in the "MU mode" (as example, at least several times the HEMUEDCATimer value 1425). This is because these frozen values, established in the past, are no longer mirroring the actual network conditions. Thus, EDCA mode may start from the standardized initial values, as if this is the initial (first) transmission with EDCA. In other words, the station may reset the contention parameter set associated with a (preferably each) traffic queue remained in the MU contention mode during at least a parameter lifespan duration, to a by-default parameter set. For instance, the parameter lifespan duration may correspond to at least two times (or more) the predetermined duration used to initialize the MU mode timer (i.e. the value of HEMUEDCATimer).

On the other hand, in case of negative determination at step 1099 (current mode is in the legacy EDCA mode), step 1030 is executed in which station 600 (more precisely virtual collision handler 212) selects the active AC queue having a zero queue backoff counter and having the highest priority. This is the case in the first and fourth phases of FIG. 5c.

At step 1040, an appropriate amount of data is selected from this selected AC for transmission.

Next, at step 1050, station 600 initiates an EDCA transmission, in case for instance an RTS/CTS exchange has been successfully performed to have an EDCA TXOP granted. Station 600 thus sends the selected data on the medium, during the granted EDCA TXOP.

Next, at step 1060, station 600 determines whether or not the EDCA transmission has ended, in which case step 1070 is executed.

At step 1070, station 600 updates the EDCA contention window CW of the selected traffic queue, based on the status of transmission (positive or negative ack, or no ack received). Typically, station 600 doubles the value of CW if the transmission failed, until CW reaches the maximum value $CW_{max}$ which depends on the AC type of the data. On the other hand, if the EDCA transmission is successful, the contention window CW is set to the minimum value $CW_{min}$ which is also dependent on the AC type of the data.

Again, it is recalled that thanks to the present invention, $CW_{min}$ and $CW_{max}$ may be the same in both legacy and MU contention modes, meaning they are not degraded during step 1170 described below. Of course, the present invention does not forbid these values to be degraded when switching to the MU mode (step 1170), for instance based on the "MU EDCA Parameter Set" element 1420 received in a management frame issued by the AP (typically a beacon frame). In that case, step 1070 is performed with reference to the degraded $CW_{min}$ and $CW_{max}$ if the considered traffic queue is in the MU mode.

Note that if the transmitted data come from a traffic queue having its reset flag enabled, this flag is disabled. Indeed, the new backoff value to be drawn will mirror its new relative priority.

Next, if the selected traffic queue is not empty after the EDCA data transmission, a new associated queue backoff counter is randomly selected from [0,CW], through a loop back to step 904. It means the station draws a new backoff value to reset the expiring queue backoff counter, after data stored in the associated traffic queue have been transmitted in the accessed communication channel.

This ends the process of FIG. 10.

In a slight variant of proposed test 1099, already introduced above, test 1099 to determine whether to access the communication channel or to draw a new backoff value may also be based on the data currently stored in the traffic queue associated with the expiring traffic queue. This is to adjust the penalty scheme to some types of data, in particular with a view of keeping QoS fairness for data not concerned with the MU UL transmission (which triggered the penalty scheme).

Focus is made on peer-to-peer (P2P—or station-to-station) data transmission between non-AP stations.

Direct Link Setup (DLS), published in the 802.11e standard, allows direct station-to-station frame transfer within a basic service set.

Later, the 802.11z standard published the Tunneled Direct Link Setup (TDLS), allowing devices to perform more efficient direct station-to-station frame transfers without support from the access point. Wi-Fi Alliance added a certification program for TDLS in 2012, and describes this feature as technology that enables stations to directly link one to the other when connected to a traditional infrastructure network.

More generally, transmissions to an Independent-BSS (IBSS) station (that is to say the destination is not registered to any BSS) can be considered as a P2P communication.

Both DLS and TLDS require that stations be associated with the same access point. As a result, communications inside a P2P group may be seen as concurrent to communications of the infrastructure network (those including the access point 110). That is, the stations involved at the same time in the P2P communications and BSS network have their transmission queue(s) 210 served with data from both traffic modes.

As a result, although the penalty scheme as envisaged by the 802.11ax standard penalizes the uplink traffic to the AP, it also blocks any legacy EDCA access for P2P communications.

To face this situation, above test 1099 can be slightly adapted as proposed above.

In particular, according to adapted test 1099, if the current mode is the legacy contention mode or if data stored in the associated traffic queue include data to be addressed to another station different from the access point (i.e. it is P2P data), the process goes to step 1030 through which the station accesses the communication channel to transmit data stored in the associated traffic queue.

On the contrary, if the current mode is the MU contention mode and data stored in the associated traffic queue does not include data to be addressed to another station different from the access point (i.e. it is P2P data), the process loops back to step 904, meaning the new backoff value is drawn to reset the expiring queue backoff counter, without having data from the associated traffic queue being transmitted in the communication channel.

In other words, test 1099 is amended as follow:

If (MU Mode is active) AND (AC queue with backoff expired does not hold P2P traffic), then test result is positive (yes);

Otherwise, it is false and conducts to step 930.

If the outcome of test 1099 is false due to the presence of P2P data while the AC queue is in the MU mode, leading to accessing the communication channel to transmit data, it seems appropriate to give priority to the transmission of such P2P data, in opposition to data intended to the AP which could be sent in the next accessed RU. It means that during step 1040 of selecting data, the P2P criterion is implemented: in case of access to the communication channel, only data stored in the associated traffic queue in the MU contention mode and to be addressed to another station different from the access point are transmitted in the accessed communication channel.

Various ways to distinguish between P2P data and UL data intended to the AP can be implemented by the station. For instance, the distinction between the two types of data can be performed using the destination address (Receiver Address or "Address1" field of MAC data frame as regards to FIG. 2d): a destination address set to the AP identifies the UL data; any other destination address identifies P2P data. Alternatively, a pending MAC frame to be transmitted in a direct path to a (T)DLS peer station, or to a station of an IBSS, may be allocated an UPLINK_FLAG parameter set to 0. This UPLINK_FLAG parameter set to 1 indicates the data is for uplink direction towards the AP only.

Thanks to this variant of the invention, the P2P traffic can still be emitted by a station.

FIG. 11 illustrates, using a flowchart, steps of accessing resource units based on RU access scheme (random or scheduled RUs) upon receiving a trigger frame 430 defining RUs. For instance, this illustrates station 502's behavior in phases 2 or 3 or 5 of FIG. 5b.

At step 1110, the station determines whether a trigger frame 430 is received from the access point in the communication network, the trigger frame reserving a transmission opportunity granted to the access point on the communication channel and defining resource units, RUs, forming the communication channel. If so, the station analyses the content of the received trigger frame.

At step 1120, the station determines whether or not it can transmit data over one of the RUs defined in the received trigger frame. The determination may involve one or both of two conditions, regarding in particular the type of RUs.

By analysing the content of the received TF, the station determines whether or not a defined RU is a scheduled resource unit assigned by the access point to the station. This may be done by looking for its own AID in the received TF, which AID will be associated with a specific scheduled RU to be used for transmission.

Also, by analysing the content of the received TF, the station determines whether or not one or more random RUs are defined in the TF, i.e. RUs the access of which being made through contention using dedicated RU contention parameters (including the above-mentioned RU backoff value 800). In that case, the station also determines whether or not its current RU backoff value allows one random RU to be selected (in particular if RU backoff value 800 is less than the number of random RUs available in the current TF).

If one scheduled RU is assigned to the station or the latter is allowed to access one random RU, the station determines the size of the random/scheduled RU or RUs to be used and step 1130 is executed. Otherwise, the station decrements the RU backoff value 800 based on the number of random resource units defined in the received trigger frame, and the process ends as the station cannot access any RU (scheduled or random) defined by the received TF.

At step 1130, the station selects at least one of the traffic queues 210 from which the data to be transmitted are selected, and adds data of the selected queue or queues to the transmission buffer until the quantity of data reaches the size of the selected resource unit to be used.

Due to the reinstatement of EDCA backoff counters counting down according to the invention, and so the dynamicity of respective backoff values, then the backoff values can be used as a means for applying priority selection. For instance, this may be done by selecting the traffic queue 210 (or queues) having the lowest associated queue backoff value. The selection of the traffic queue thus depends on the value of the EDCA backoff 211 (this method guarantees that the station respects the EDCA principle and then ensures a correct QoS for its data).

In a variant, the AP may have indicated a preferred AC inside the trigger frame parameters. Thus, the station may instead select a non-empty traffic queue associated with a data type matching a data type associated with the resource unit over which the data to select are to be transmitted. Such specified data type may be a traffic queue indicated by the AP in the trigger frame, for instance using the Preferred AC field 1340 of FIG. 13 when the AC Preference Level field is set to 1.

In this variant, data transmitted in a resource unit provided by the access point within a transmission opportunity granted to the access point are retrieved from a preferred traffic queue indicated by the access point. And the preferred traffic queue indication is included in a trigger frame received from the access point, the trigger frame reserving the transmission opportunity granted to the access point on the communication channel and defining resource units, RUs, forming the communication channel including the accessed resource unit.

In another variant based on the reset flag introduced above (when describing the scenario of FIG. 5c or when looping back to step 904 from new test 1099), the station may preferably select data from the traffic queues that have been reset in the meanwhile (i.e. since the last OFDMA transmission, without any transmission therefrom). This is to give priority to these data that had the highest priority at a given time due to their backoff values, before their relative priorities were slightly degraded by the backoff counter reset.

If data are selected from a traffic queue having a reset flag enabled, the same reset flag shall be disabled so that the relative priority of that traffic queue is only given by the associated backoff value.

Also note that in case P2P traffic is handled, step 1130 may be limited to the selection of UL data, i.e. data intended to the AP.

Next at step 1140, the station may store the fact that the selected traffic queue is a transmitting traffic queue. For instance, the first traffic queue selected (i.e. upon the first occurrence of step 1130) may be memorized as the primary traffic queue, and the other selected traffic queues as secondary traffic queues At step 1150, the station determines whether or not the amount of data stored in the transmission buffer is enough to fill the selected resource unit.

If not, there is still room for additional data in the resource unit, for serving another AC queue. A second AC queue (called secondary AC) can be determined using the same criteria as defined above on the remaining traffic queues. Thus the process loops back to step 1130 during which another traffic queue is selected. In such a way, the transmission buffer is progressively filled up to reaching the selected resource unit size.

One may thus note that a plurality of transmitting traffic queues of the same station may be involved during a MU UL OFDMA transmission, thereby resulting in having the plurality of queues entering the MU EDCA mode.

In a variant which avoids mixing data from two or more traffic queues (i.e. the data for the selected RU are selected from a single traffic queue), padding data may be added to entirely fill the selected RU. This is to ensure the whole RU duration has energy that can be detected by legacy stations.

According to another variant implementing a specific data aggregation rule, if the first selected traffic queue has not data enough to fully fill in the accessed resource unit, data from higher priority traffic queues may be selected.

Once the transmission buffer is full for the selected RU, step 1160 initiates the MU UL OFDMA transmission of the data stored in the transmission buffer, to the AP. The MU UL OFDMA transmission is based on the OFDMA sub-channel and modulation defined in the received trigger frame and especially in the RU definition.

Next, once the transmission has been performed, and preferably upon successful transmission (i.e. an acknowledgment is received from the AP), the transmitting queues identified at step 1140 enter the MU mode. One or more transmitting queues may already be in the MU mode.

A MU mode timer may be initialized with the HEMUEDCATimer, which MU mode timer progressively elapses as the time goes. Note that if the MU mode timer is already elapsing when a new transmission 1160 successively ends (meaning the station was already in the MU EDCA mode), the MU mode timer is reinitialized again to HEMUEDCATimer in order to keep the station in MU EDCA mode for a next HEMUEDCATimer period.

Thus, step 1170 may be performed to determine the new value or values to be applied to one or more EDCA parameters of the traffic queue or queues, in order to modify it or them into penalized value or values, if appropriate.

As mentioned above, step 1170 is now optional (compared to the prior art document) as the penalty scheme is now fully implemented through new step 1099 of the EDCA state machine in embodiments.

Not modifying the EDCA parameters means the MU contention mode uses the same arbitration interframe space durations as the legacy contention mode, and also the MU contention mode uses the same lower boundary $CW_{min}$ and/or same higher boundary $CW_{max}$, both defining a selection range from which a size of the contention window is selected, as the legacy contention mode.

Using the same values advantageously reduces the bandwidth used by the AP to transmit the parameters in the beacon frames. Indeed, the "MU EDCA Parameter Set" element 1420 can be greatly reduced, to only inform of the HEMUEDCATimer value. In other words, fields 1421-1424 may be removed from 1420.

In addition, one can note that, as the EDCA backoff values are now evolving again over time, a regular polling of several traffic queues is performed and thus a unique MU mode timer to exit the MU mode is sufficient to efficiently drive the stations.

Next, optional step 1180 is implemented to also restore the QoS feature supported by the backoff counters, resulting in more frequently re-computing backoff value.

In this optional step, a new EDCA backoff value may be drawn for each transmitting traffic queue, even if its current backoff value is not down to zero. This is to keep relative priorities among the traffic queues (a redrawn value has great chance to be upper as pending ones on the other traffic queues, thus the other would take precedence for next transmissions).

For instance, the station computes or draws, for at least one traffic queue transmitting in the accessed resource unit, a new backoff value to reset the associated queue backoff counter. This is the case of backoff counters 531 and 532 at the end of the second and third phases of the scenario of FIG. 5c.

In a first embodiment, a new queue backoff value is computed only for the transmitting traffic queue from which data are transmitted at the beginning of the accessed resource unit. Preferably, only the primary traffic queue as identified in step 1140 is concerned with a reset with the new queue backoff value.

In a second embodiment, a new queue backoff value is computed for each transmitting traffic queue identified in step 1140.

One can note that, even if some backoff values are redrawn (and thus corresponding backoff counters reset), it remains that these values will be decremented again and thus offer new opportunities to reach zero, in which case test 1099 will be performed again to operate in accordance with the current contention mode.

While the above embodiments of the invention provide the penalty scheme in case of use of both scheduled and random accesses on UL MU resource unit, one may envisaged only applying the penalty scheme only in response to successful transmission in scheduled RUs. This is motivated in the sense that penalizing MU EDCA parameters (1150) would be applied in regards to the AP behavior (if the AP really decides to grant (schedule) an UL access to a given station). For random accessed RUs, the AP does not specify any specific station (i.e. does not explicitly demonstrate it is prioritizing one station among others), so a penalty would not be considered to be applied onto EDCA access mode.

FIG. 12 illustrates, using a flowchart, the station management to switch back to the legacy EDCA mode in the examples above. This management is based on the HEMUEDCATimer mentioned above. Indeed, the station remains in the MU EDCA mode as long as this MU mode timer has not lapsed.

Thus at step 1210, it is checked whether or not the HEMUEDCATimer has lapsed/expired, i.e. has reached the value 0.

In the affirmative, the station switches back to the EDCA mode at step 1220, for instance by setting the 'MU Mode' flag to 0 for all traffic queues.

In this embodiment, all the degraded traffic queues share the same predetermined degrading duration HEMUEDCATimer, so that all the degraded traffic queues exit the degraded MU EDCA mode simultaneously. The exiting may mean restoring legacy EDCA parameters in case the MU mode involves degraded EDCA parameters.

Note that due to the re-initialization of the MU mode timer at each new MU UL OFDMA successful transmission by the station, the expiry of the MU mode timer only occurs when no data is transmitted, from the station, in any RU provided by the AP within subsequent TXOPs granted to the AP during the predetermined degrading duration HEMUEDCATimer.

Next, the process ends at step 1230.

FIG. 13 illustrates the structure of a trigger frame as defined in the 802.11ax draft standard.

The trigger frame 1300 is composed of a dedicated field 1310 called "User Info" Field. This field contains a "Trigger dependent Common info" field 1320 which contains the "AC Preference Level" field 1330 and "Preferred AC" field 1340.

The Preferred AC field 1330 is a 2-bit field indicating the AC queue (value from 0 to 3) from which data should be sent by the station on the RU allocated that station in the trigger frame.

The AC preference Level field 1330 is a bit indicating if the value of the Preferred AC field 1340 is meaningful or not. If the field 1340 is set to 1, then the station should take into account the preferred AC field 1340 when selecting data at step 1130. If the field 1330 is set to 0, the station is allowed to send data from any AC queue, regardless of the preferred AC field 1340 value.

The other fields of the trigger frame are defined in the 802.11ax standard.

The AP may also be in charge of broadcasting the EDCA parameters for both EDCA mode and MU mode (if it had degraded parameter values). It preferably performs the broadcasting using a well-known beacon frame, dedicated to configure all the stations in an 802.11 cell. Note the if the AP fails to broadcast the EDCA parameters, the stations are configured to fall-back to by-default values as defined in the 802.11ax standard.

Figure 14A:
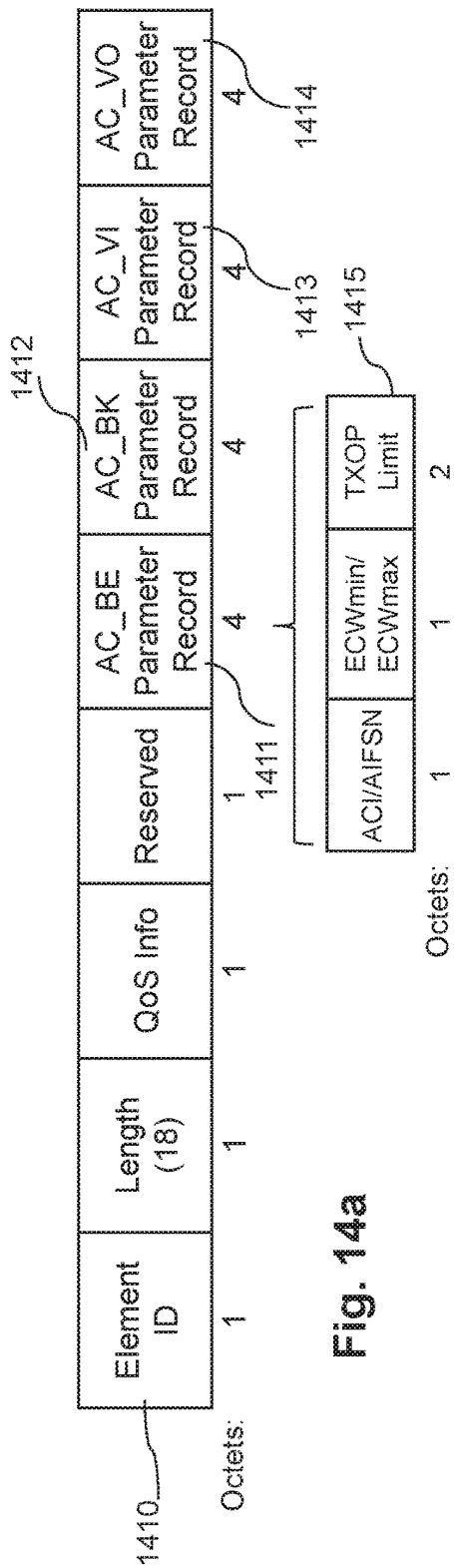
FIG. 14a illustrates the structure of a standardized information element used to describe the parameters of the EDCA in a beacon frame.

FIG. 14a illustrates the structure of a standardized information element 1410 used to describe the legacy EDCA parameters in a beacon frame.

Fields 1411, 1412, 1413, 1414 describes the parameters associated with each traffic queue 210. For each traffic queue, a subfield 1415 includes the EDCA parameters: AIFSN as a delay before starting to decrease the associated backoff value, the ECWmin and ECWmax as the values of the minimum $CW_{min}$ and maximum $CW_{max}$ contention window and finally the TXOP limit as the maximum transmitting data time for an 802.11 device.

All the others fields of the information element are those described in the 802.11 standard.

This standardized information element 1410 is used by the stations to configure themselves in the legacy EDCA mode.

Figure 14B:
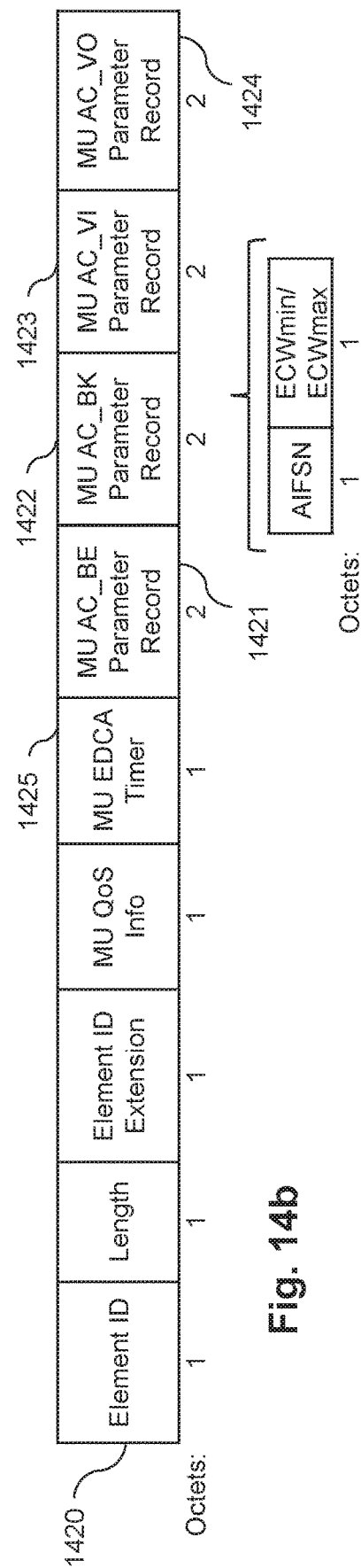
FIG. 14b illustrates an exemplary structure of a dedicated information element to transmit degraded EDCA parameter values according to embodiments of the invention, as well as the HEMUEDCATimer value.

FIG. 14b illustrates an exemplary structure of a dedicated information element 1420 to transmit the parameter values for the MU mode according to the invention, including the possible degraded EDCA parameters (if any) and the HEMUEDCATimer value (always existing). The dedicated information element 1420 may be included in a beacon frame sent by the AP.

The dedicated information element 1420 includes, for each AC queue, the degraded EDCA parameters (1421,1422, 1423,1424) to be used by the stations in the MU mode. It also includes a subfield 1425 specifying the value of the HEMUEDCATimer.

Each subfield 1421,1422,1423,1424 includes a degraded AIFSN value (if any) for the corresponding traffic queue, as well as the degraded ECWmin value and degraded ECWmax value (they can be the same as the legacy EDCA values). A value 0 of the AIFSN field indicates that the AIFS is equal to the HEMUEDCATimer value set in the MU EDCA Timer subfield 1425.

Of course, if the MU mode uses the legacy EDCA parameters, fields 1421,1422,1423,1424 can be omitted, thereby reducing bandwidth use.

MU EDCA Timer subfield 1425 indicates the HEMUEDCATimer value, in units of 8 TUs (a Time Unit is a measurement of time equal to 1024 µs).

In this example, the sets of non-degraded values and of degraded values (if any), as well as the HEMUEDCATimer value are transmitted within a beacon frame, periodically transmitted by the access point to broadcast network information about the communication network to the plurality of stations. In variants, they may be included in Probe Response frames, or (Re-)Association Response frames.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication apparatus comprising:
   receiving means for receiving a signal transmitted from a base station constructing a wireless network conforming to IEEE802.11 series of standards, the signal including information on an AIFSN value, and
   control means configured to, in a case where the AIFSN value included in the signal received by the receiving means is zero and upon successfully transmitting data of an access category in an accessed uplink OFDMA resource unit provided by the base station, switch the access category from a legacy contention mode to an MU contention mode and prevent data of the access category from being transmitted to the wireless network;

wherein, in the MU contention mode, Enhanced Distributed Channel Access (EDCA) transmission of data of an access category is disabled.

2. The communication apparatus of claim 1, wherein the control means are configured to decide, based on a current contention mode of the access category, between EDCA transmitting data of the access category and drawing a new EDCA backoff for the access category without EDCA transmitting data of the access category.

3. The communication apparatus of claim 2, wherein the control means are configured to perform the deciding step further based on whether data of the access category are to be addressed to the base station or not.

4. The communication apparatus of claim 1, wherein the control means are configured to perform EDCA access to the wireless network in both legacy contention mode and MU contention mode using the same arbitration interframe space durations, and/or the same lower boundary CWmin and/or same higher boundary CWmax, both defining a selection range from which a size of an EDCA-based contention window for the access category is selected.

5. The communication apparatus of claim 1, wherein the control means are configured to switch back the access category to the legacy contention mode upon expiry of an MU mode timer initialized when the access category switched to the MU contention mode.

6. The communication apparatus of claim 1, wherein the control means are configured to enable a reset flag associated with the access category each time an EDCA-access to the wireless network is gained without transmitting data of the access category over the wireless network and to disable the reset flag each time data of the access category are transmitted.

7. The communication apparatus of claim 6, wherein the control means are configured to select data to be sent over an accessed uplink OFDMA resource unit provided by the base station, based on the enabled/disabled status of the reset flag.

8. The communication apparatus of claim 1, wherein the control means are configured to reset EDCA contention parameters associated with the access category as soon as the access category remains in the MU contention mode during at least a parameter lifespan duration.

9. The communication apparatus of claim 1, wherein the control means are configured to switch the access category to the MU contention mode only upon successfully transmitting the data of the access category in the accessed uplink OFDMA resource unit.

10. A communication method comprising, at a station:
receiving a signal transmitted from a base station constructing a wireless network conforming to IEEE802.11 series of standards, the signal including information on an AIFSN value, and
performing control to, in a case where the AIFSN value included in the signal received by the receiving means is zero and upon successfully transmitting data of an access category in an accessed uplink OFDMA resource unit provided by the base station,
switch the access category from a legacy contention mode to an MU contention mode and prevent data of the access category from being transmitted to the wireless network;
wherein, in the MU contention mode, Enhanced Distributed Channel Access (EDCA) transmission of data of an access category is disabled.

11. A non-transitory computer-readable medium storing a program which, when executed by a microprocessor or computer system in a device, causes the device to perform the method of claim 10.

* * * * *